United States Patent
Dowlatkhah et al.

(10) Patent No.: US 10,499,446 B1
(45) Date of Patent: Dec. 3, 2019

(54) INSTANTIATING A SLICE OF A 5G OR OTHER NEXT GENERATION SERVICE NETWORK IN AN UNDERSERVED AREA

(71) Applicants: AT&T INTELLECTUAL PROPERTY I, L.P., Atlanta, GA (US); AT&T Mobility II LLC, Atlanta, GA (US)

(72) Inventors: Sangar Dowlatkhah, Alpharetta, GA (US); Zhi Cui, Sugar Hill, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 16/104,771

(22) Filed: Aug. 17, 2018

(51) Int. Cl.
*H04W 76/18* (2018.01)
*H04W 4/50* (2018.01)
(Continued)

(52) U.S. Cl.
CPC .............. *H04W 76/18* (2018.02); *H04W 4/08* (2013.01); *H04W 4/50* (2018.02); *H04W 8/005* (2013.01)

(58) Field of Classification Search
CPC ......... H04W 28/08; H04W 4/02; H04W 4/06; H04W 76/15; H04W 76/14
See application file for complete search history.

(56) References Cited

U.S. PATENT DOCUMENTS 8,190,168 B2  5/2012  Wong et al.
9,049,985 B2  6/2015  Feher
(Continued)

FOREIGN PATENT DOCUMENTS

CA  2811467 A1  3/2012
EP  3000217 A2  3/2016
(Continued)

OTHER PUBLICATIONS

Kavanagh, Sacha. "What is Network Slicing?" 5G. Updated Jan. 11, 2018. [https://5g.co.uk/guides/what-is-network-slicing/]. Retrieved Jul. 22, 2018. 8 pages.

(Continued)

*Primary Examiner* — Diane D Mizrahi
(74) *Attorney, Agent, or Firm* — Amin, Turocy & Watson, LLP

(57) ABSTRACT

Techniques for creating a service slice of a network in an underserved area are presented. A vehicle can be associated with a slice component that can generate service slices of a service network for various services. The vehicle can travel to an underserved area that does not have adequate wireless coverage or advance capabilities. For a communication device associated with an entity located in an underserved area, slice component can generate a service slice to connect the communication device to the communication network (and service network), establish a session with the communication device, provide applications, including virtual network function (VNF) applications, to the communication device, and communicate information between the communication device and communication network (and service network). If no radio access to the network is available, slice component can continue the session with an internal slice and store information in its service database, which is synced when reconnected to the network.

20 Claims, 9 Drawing Sheets

(51) Int. Cl.
*H04W 4/08* (2009.01)
*H04W 8/00* (2009.01)

(56) References Cited

U.S. PATENT DOCUMENTS

| | | | |
|---|---|---|---|
| 9,172,678 B2* | 10/2015 | Wang | .............. H04L 63/0272 |
| 9,281,928 B2 | 3/2016 | Porat et al. | |
| 9,928,379 B1 | 3/2018 | Hoffer | |
| 2009/0029645 A1 | 1/2009 | Leroudier | |
| 2015/0245272 A1 | 8/2015 | Lindoff et al. | |
| 2016/0275801 A1 | 9/2016 | Kopardekar | |
| 2017/0064731 A1 | 3/2017 | Wang et al. | |
| 2018/0092139 A1 | 3/2018 | Novlan et al. | |
| 2018/0132270 A1 | 5/2018 | Zeng et al. | |
| 2019/0026094 A1* | 1/2019 | Stammers | .............. H04W 4/80 |

FOREIGN PATENT DOCUMENTS

| | | |
|---|---|---|
| EP | 3310117 A1 | 4/2018 |
| GB | 812730 A | 4/1959 |
| WO | 2018026466 A1 | 2/2018 |
| WO | 2018082015 A1 | 5/2018 |
| WO | 2018084603 A1 | 5/2018 |

OTHER PUBLICATIONS

Gutz, et al.. "Splendid isolation: A slice abstraction for software-defined networks" Proceedings of the first workshop on Hot topics in software defined networks, ACM, 2012. 6 pages.

Nikaein, et al. "Network store: Exploring slicing in future 5g networks" Proceedings of the 10th International Workshop on Mobility in the Evolving Internet Architecture, ACM, 2015. 6 pages.

Patil, et al. "Towards secure and dependable storage services in cloud computing" International Journal of Innovative Research in Advanced Engineering 1.9 (2014): 57-64.

Pries, et al. "Network as a Service—A Demo on 5G Network Slicing" 28th International Teletraffic Congress (ITC 28) (2016). 3 pages.

Afolabi, et al. "Network Slicing & Softwarization: A Survey on Principles, Enabling Technologies & Solutions" in IEEE Communications Surveys & Tutorials (2018). 24 pages.

\* cited by examiner

INSTANTIATING A SLICE OF A 5G OR OTHER NEXT GENERATION SERVICE NETWORK IN AN UNDERSERVED AREA

TECHNICAL FIELD

The subject disclosure relates generally to communications networks, and, for example, to instantiating a slice of a 5G or other next generation service network in an underserved area.

BACKGROUND

Communication devices, including wearable devices, sensory monitoring devices, and other types of mobile or portable communication devices, can be utilized for a variety of purposes. For example, such communication devices can be utilized in the healthcare industry to monitor conditions of patients, collect information regarding conditions of patients, and communicate such information to hospitals or other healthcare providers. When such communication devices are remotely located from a hospital or other healthcare provider, such communication devices typically have to be connected to a communication network in order to communicate with a communication device of the hospital or other healthcare provider.

The above-described description is merely intended to provide a contextual overview relating to communication devices and communication networks, and is not intended to be exhaustive.

BRIEF DESCRIPTION OF THE DRAWINGS

Various non-limiting embodiments are further described with reference to the accompanying drawings in which.

DETAILED DESCRIPTION

Figure 1:
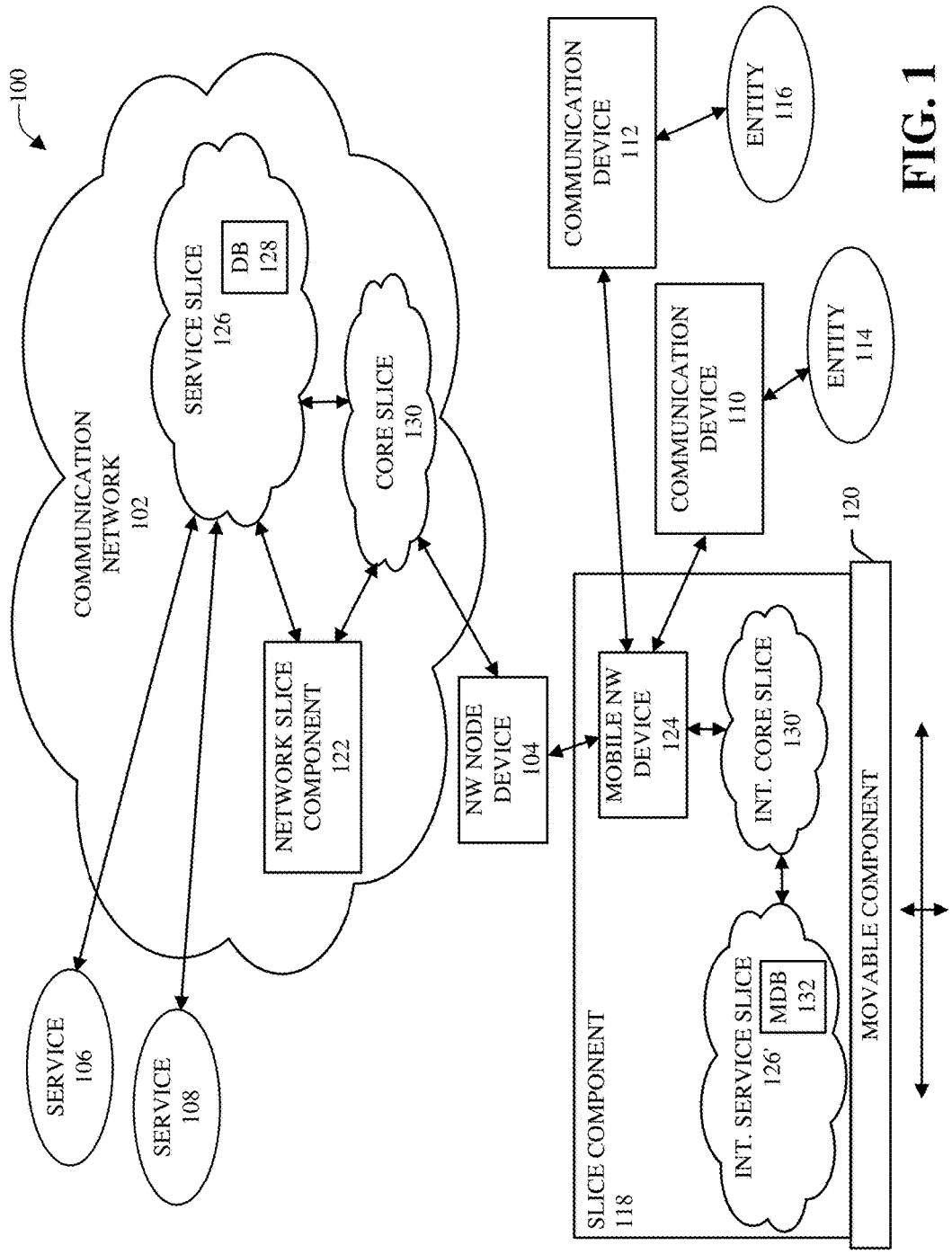
FIG. 1 depicts a block diagram of an example, non-limiting system that can generate and manage slices of a service network for communication devices, in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular network environment or standard).

Discussed herein are various aspects that relate to instantiating slices (e.g., service slice, core slice) of a 5G or other next generation service network in an underserved area. By instantiating slices of a 5G or other next generation service network in an underserved area, the disclosed subject matter can significantly the provision of services of a service network to a communication device in an underserved area and securely communicating data between the communication device in the underserved area and the service network associated with a communication network (e.g., macro or small cell communication network), wherein the underserved area can be, for example, an area that would otherwise have limited or no connectivity to the communication network and associated service network, and/or no or inadequate advance capabilities, such as, for example, network slicing.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Such wireless communication technologies also can include Bluetooth™ or near field communication (NFC) technologies. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/ HSPA, Global System for Mobile Communications (GSM)/ GSM EDGE Radio Access Network (GERAN), Wi Fi, Wireless Local Area Network (WLAN), WiMax, CDMA2000, and so on).

As used herein, "5G" can also be referred to as New Radio (NR) access. Accordingly, systems, methods, and/or machine-readable storage media for instantiating slices (e.g., service slice, core slice) of a 5G or other next generation service network in an underserved area, can be desired. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also will employ massive MIMO systems (e.g., hundreds of antennas at the transmitter side and receiver side). Typically, with a ($N_t$, $N_r$), where $N_t$ denotes the number of transmit antennas and $N_r$ denotes the number of receive antennas, the peak data rate can multiple with a factor of $N_t$ over single antenna systems in a rich scattering environment.

To meet the significant demand for data centric applications, 3GPP systems and systems that employ one or more aspects of the specifications of the 4G standard for wireless communications can be extended to a 5G standard for wireless communications. Some unique challenges can exist to provide levels of service associated with forthcoming 5G, or other next generation, standards for wireless communication.

Communication devices, including wearable devices, sensory monitoring devices, and other types of mobile or portable communication devices, can be utilized for a variety of purposes. For example, such communication devices can be utilized in the healthcare industry to monitor conditions of patients, collect information regarding conditions of patients, and communicate such information to hospitals or other healthcare providers. When such communication devices are remotely located from a hospital or other healthcare provider, such communication devices typically have to be connected to a communication network in order to communicate with a communication device of the hospital or other healthcare provider.

For instance, a wearable communication device can monitor and record information relating to virtually everything a user does. This can include movement of the user, one or more bodily readings, such as blood sugar and/or heart rate of the user, and/or the humidity level when the user was running on a treadmill. The recorded information relating to the user can be directly transmitted to third-party servers or can become add-on metadata that can be used for number of diagnostic and statistical application and services. However, there can be certain more serious or significant healthcare related scenarios where the information collected from the communication devices of patients can be vital and personal, wherein there can be stringent measures for collecting, communicating, and protecting such data in a secure HIPAA-compliant environment to maintain data integrity and patient confidentiality. This disclosed subject matter can address such issues and can describe how a closed and secure environment (e.g., HIPAA-compliant environment or other secure environment) can be created and used to collect and protect vital and personal information regarding users (e.g., patients or other users).

To that end, the disclosed subject matter presents techniques, methods, and systems for creating a service slice of a network in an underserved or unserved area. A movable component (e.g., a vehicle or motorized device) can comprise a slice component that can generate service slices of a service network for various types of services and/or applications (e.g., healthcare-related services, law enforcement-related services, military-related services, farming-related services, agricultural-related services, transportation-related services, manufacturing-related services, construction-related services, . . . ). There can be underserved or unserved areas (e.g., rural or pastoral areas) where connectivity, such as wireless connectivity, to a communication network and associated service network can be undesirably limited or non-existent and/or advance capabilities, such as, for example, network slicing, are not available or are not adequate.

The movable component (e.g., automobile or truck, ship, plane, drone device, robotic device, . . . ) can travel to an underserved or unserved area that does not have any, or does not have adequate, wireless communication coverage and/or advance capabilities. With regard to a communication device associated with a user, a piece of equipment or machine (e.g., tractor, plow, excavator, bulldozer, truck, tank, . . . ), or other entity or object (e.g., a farm animal, a wild animal, . . . ) located in the underserved or unserved area, the slice component can generate a service slice (e.g., slice of a virtual network), and generate a corresponding core slice, to connect the communication device to the communication network (e.g., macro or small cell communication network) and associated service network, establish a session with the communication device, provide or facilitate providing applications, including virtual network function (VNF) applications, to the communication device, and communicate information between the communication device and the communication network and the associated service network.

In some embodiments, if no radio access (e.g., wireless communication access) to the communication network is available, the slice component can continue the communication session with the communication device by using an internal slice (e.g., internal service slice, and internal core slice) and storing information relating to the communication session in the service database of the slice component, wherein the database component (e.g., internal database component of the internal service network) of the slice component can be synced with the database component (e.g., main database component) of the service network when the slice component is reconnected to the communication network and associated service network. For instance, there can be occasions where the slice component is not able to establish a communication connection, or can lose connection, to the communication network for a variety of reasons (e.g., vehicle moved to a location where connection by the slice component to the communication network is not able to be made and/or interference with wireless communication between the slice component and the communication network). On such occasions, the slice component can establish or maintain a communication session with the communication device, generate and maintain an internal slice of the service network, and provide or facilitate providing applications, including VNF applications, to the communication device. The slice component can store information relating to the communication session in the database component of the slice component (e.g., a local or "light" version of the main database component that can be maintained by the service network). When the slice component is able to connect or reconnect to the communication network and the associated service network (e.g., when the vehicle moves to a location where connection to the communication network is possible and/or when connection to the communication network is otherwise possible), the slice component can synchronize the information relating to the communication session in its database component with the main database component of the service network to store the information relating to the communication session in the main database component and/or to communicate certain information from the service network (e g, main database component of the service network) to the communication device.

These and other aspects and embodiments of the disclosed subject matter will now be described with respect to the drawings.

FIG. 1 depicts a block diagram of an example, non-limiting system 100 that can generate and manage slices of a service network for communication devices, in accordance with one or more embodiments described herein. The system 100 can comprise a communication network 102 that can facilitate (e.g., enable) communications between communication devices (e.g., UEs). The communication network 102 can be or can comprise, for example, a macro communication network, a small cell communication network, or other type of communication network. The communication network 102 can comprise or be associated with various components, such as network node devices (e.g., radio network node devices), routers, switches, interfaces, controllers, and/or other components, that can facilitate communication of data between communication devices in the communication network environment. For example, the communication network 102 can comprise or be associated with various (e.g., virtually any number of; virtually any type of) network node devices, such as network (NW) node device 104 (e.g., base station, NodeB, eNodeB (e.g., evolved NodeB), or gNodeB (e.g., gNB)). In some embodiments, the communication network 102 can comprise or be associated with a cloud network. In certain embodiments, the communication network 102, including the network node devices and/or other components of or associated with the communication network 102, can employ MIMO technology to facilitate data communications between devices (e.g., network node devices, communication devices, . . . ) in the communication network 102.

As used herein, the terms "network node device," "network node," and "network device" can be interchangeable with (or include) a network, a network controller or any number of other network components. Further, as utilized herein, the non-limiting term radio network node, or network node (e.g., network device, network node device) can be used herein to refer to any type of network node serving communications devices and/or connected to other network nodes, network elements, or another network node from which the communications devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices also can comprise multiple antennas for performing various transmission operations (e.g., MIMO operations). A network node can comprise a cabinet and other protected enclosures, an antenna mast, and actual antennas. Network devices can serve several cells, and associated sectors (e.g., a sector can comprise one or more cells), depending on the configuration and type of antenna. Network node devices can be, for example, Node B devices, base station (BS) devices, access point (AP) devices, TRPs, and radio access network (RAN) devices. Other examples of network node devices can include multi-standard radio (MSR) node devices, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like.

The communication network 102 can comprise a set of cells, wherein respective cells can be associated with respective base stations (e.g., network node device 104). For example, a radio access network (RAN) (not shown in FIG. 1) can comprise or be associated with a set of base stations that can serve communication devices located in respective coverage areas served by respective base stations in the communication network 102. In some embodiments, the RAN can be a cloud-RAN (C-RAN) that can be located in or associated with a cloud computing environment, comprising various cloud network components of the communication network 102. The respective cells of the set of cells can have respective coverage areas that can form the coverage area covered by one or more sectors of the communication network 102. The respective communication devices can be communicatively connected to the communication network 102 via respective wireless communication connections with one or more of the respective cells.

The communication network 102 can comprise or be associated with a core network and service network, wherein the core network can facilitate providing wireless and other communication services to the coverage area covered by the communication network 102, and wherein the service network can facilitate providing various applications and services, such as, for example, service 106 and service 108, as well as applications relating to such services. While two services (e.g., 106, 108) are depicted in FIG. 1, it is to be appreciated and understood that virtually any desired number of services and applications can be provided by the service network. The services and applications can be virtually any type of service or application that is able to be provided via the communication network 102 to communication devices associated with the communication network 102 and associated service network. For example, the services (and related applications) can be or relate to healthcare-related services, law enforcement-related services, military-related services, finance-related services, farming-related services, agricultural-related services, transportation-related services, manufacturing-related services, construction-related services, machine-related services, equipment-related services, and/or other types of services.

As described herein, the communication network 102 (e.g., macro and/or small cell communication network) can provide communication coverage (e.g., wireless communication coverage and services) to certain areas (e.g., certain geographical areas) to facilitate providing communication services, and other services (e.g., services (e.g., 106, 108) of the service network) and applications, to communication devices in those certain areas. However, there can be other areas, such as underserved or unserved areas (e.g., rural, pastoral, other remote areas, or other underserved or unserved areas), where the communication network 102 is typically not able to provide communication services (e.g., wireless communication coverage and services), and/or advance capabilities, such as, for example, network slicing, to communication devices in such other areas. Also, there can be instances where, even in the certain areas, the communication network 102 can be unable to provide any communication coverage or advance capabilities, or unable to provide desirable (e.g., suitable, acceptable) communication coverage or advance capabilities, to a portion of the certain areas. For instance, one or more network node devices (e.g., base station, NodeB, eNodeB, or gNB) of or associated with the communication network 102 can be inoperable (e.g., temporarily inoperable) or can be subject to interference that can prevent or inhibit (e.g., temporarily prevent or inhibit) the one or more network node devices from providing communication coverage to the portion of the certain areas. Consequently, the portion of the certain areas can be, at least temporarily, underserved or unserved areas. As a result, communication devices in the unserved or underserved areas can be unable to access, or at least unable to desirably (e.g., suitably, acceptably, reliably) access the communication network 102 and associated service network, including the services (e.g., 106, 108), and associated applications, of the service network.

The disclosed subject matter can overcome these and other deficiencies relating to providing communication coverage (e.g., wireless communication coverage), advance capabilities (e.g., network slicing), and services (e.g., 106, 108) of the service network to communication devices in unserved or underserved areas, such as, for example, communication devices 110 and 112, which can be located in unserved or underserved areas. The disclosed subject matter can employ a slice component 118 that can provide or facilitate providing communication coverage and communication services, and services (e.g., 106, 108) and associated applications of the service network via service slices, to communication devices (e.g., 110, 112) located in unserved or underserved areas, as more fully described herein.

In some embodiments, the slice component 118 can be associated with (e.g., attached to, part of, integrated with, stored or stowed on, . . . ) a movable component 120 (e.g., vehicle, motorized device, . . . ). The movable component 120 can move the slice component 118 from location to location, such as moving the slice component 118 to an unserved or underserved area where communication devices, such as communication devices 110 and/or 112, are located. The movable component 120 can be directly controlled by a user (e.g., a human user, or a non-human user) that is located on or within the movable component 120 or can be remotely controlled by a user (e.g., the movable component can be a drone that can be remotely controlled by a user using a remote control device associated with (e.g., communicatively connected to) the drone). The movable component 120 can be, for example, an automobile, a truck, a ship or boat, a plane, a helicopter, a drone device, a robotic device, a bicycle, a balloon (e.g., hot-air balloon), or other desired motorized, non-motorized, or manually movable vehicle or device. As an example, the movable component 120 can be a vehicle (e.g., truck, van, car, . . . ), associated with the slice component 118, that can travel to an underserved or unserved area (e.g., a rural or pastoral area) to enable the slice component 118 to connect with communication devices associated with other vehicles (e.g., tractors, trucks, bulldozers, . . . ) located in that underserved or unserved area. As some other examples, the movable component 120 can be a drone device or helicopter, associated with the slice component 118, that can fly (e.g., drone flying via remote control), to an underserved or unserved area, over animals wearing communication devices (e.g., wearable collars or tags that are communication devices) that can communicate with the slice component 118, or fly over vehicles (e.g., tractors, trucks, bulldozers, . . . ) in an underserved or unserved area, wherein those vehicles can have communication devices associated therewith that can communicate with the slice component 118.

The respective communication devices (e.g., 110, 112) in the unserved or underserved areas can be associated with respective entities, such as, for example, entity 114 and entity 116, respectively, wherein an entity can be a user (e.g., a human being, or a non-human user), equipment, a machine, a device, an animal, a plant, or other type of entity. As some examples, an entity (e.g., 114, 116) can be a person who has a communication device (e.g., a mobile phone, computer, or wearable device); an animal (e.g., farm animal, wild animal, domesticated animal) wearing a communication device (e.g., a neck collar, tag, sensor, or other device having wireless communication functionality); a plant associated with or in proximity to a communication device (e.g., a collar, tag, sensor, or other device having wireless communication functionality); or equipment or a machine (e.g., tractor, plow, bulldozer, excavator, truck, . . . ) associated with a communication device. A communication device (e.g., 110) can comprise or be associated with one or more sensors or instruments (e.g., healthcare-related sensors or instruments, farm or agricultural-related sensors or instruments, transpiration-related sensor or instruments, environment-related sensors or instruments, military-related sensors or instruments, law enforcement-related sensors or instruments, . . . ) that can sense conditions or perform desired operations.

With further regard to communication devices, a communication device (e.g., 110, 112, . . . ) also can be referred to as, for example, a device, a mobile device, or a mobile communication device. The term "mobile device" can be interchangeable with (or include) a UE or other terminology. Mobile device (or UE) can refer to any type of wireless device that can communicate with a radio network node in a cellular or mobile communication system. Examples of mobile devices can include, but are not limited to, a target device, a device to device (D2D) UE, a machine type UE or a UE capable of machine to machine (M2M) communication, a Personal Digital Assistant (PDA), a tablet or pad (e.g., an electronic tablet or pad), a mobile terminal, a cellular and/or smart phone, a computer (e.g., a laptop embedded equipment (LEE), a laptop mounted equipment (LME), or other type of computer), a dongle (e.g., a Universal Serial Bus (USB) dongle), an electronic gaming device, electronic eyeglasses, headwear, or bodywear (e.g., electronic eyeglasses, headwear, or bodywear having wireless communication functionality), a device associated or integrated with a vehicle (e.g., automobile, train, motorcycle, bicycle, ship, plane, . . . ), a motorized device (e.g., drone), or other entity, and so on.

It is noted that the various aspects of the disclosed subject matter described herein can be applicable to single carrier as well as to multicarrier (MC) or carrier aggregation (CA) operation of the mobile device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data plus speech is simultaneously scheduled).

With further regard to the slice component 118 and other aspects of the disclosed subject matter, the slice component 118 can establish a communication session with a communication device(s) (e.g., 110 and/or 112), generate a service slice (e.g., slice of a virtual network) for use by the communication device, and generate a corresponding core slice for use by the communication device, to connect the communication device(s) (e.g., 110 and/or 112) to the communication network 102 (e.g., macro and/or small cell communication network) and associated service network, provide access to one or more services (e.g., 106 and/or 108) of the service network, provide or facilitate providing applications, including VNFs, associated with the one or more services to the communication device, and communicate information between the communication device and the communication network 102 and the associated service network. In some embodiments, the slice component 118 can coordinate with a network slice component 122 of the communication network 102 to facilitate generating slices for, providing access to services (e.g., 106 and/or 108) to, and providing applications to, communication devices (e.g., 110 and/or 112), and communicating information between the communication devices and the communication network 102 and the associated service network.

To facilitate establishing a communication session, the slice component 118 can initiate, establish, or facilitate establishing (e.g., generating) a communication connection between a communication device (e.g., 110) and the communication network 102 (e.g., a network device of the communication network 102 via a mobile network (NW) device 124 (e.g., mobile network node device) of the slice component 118, for example, when the movable component 120 and associated slice component 118 are located (e.g., travel to be located) in proximity to (e.g., within a defined distance of) the communication device (e.g., 110). For instance, the movable component 120, and associated slice component 118, can move to a location that is sufficiently in proximity to the communication device (e.g., 110) to enable a communication connection to be established between the communication device (e.g., 110) and the slice component 118 (e.g., the mobile network device 124 of the slice component 118) using a desired communication technology(ies) and associated communication protocol(s). The communication technology(ies), and associated communication protocol(s), can be virtually any communication technology and associated protocol, such as, for example, any of the wireless communication technologies (and associated communication protocols) disclosed herein.

The mobile network device 124 also can establish a connection with the network node device 104 of the communication network 102 to facilitate establishing the communication connection between the communication device (e.g., 110) and the communication network 102 and associated network slice component 122 (e.g., via the mobile network device 124 and the network node device 104).

The slice component 118 can generate or facilitate generating a slice 126 (e.g., service slice) of the service network, wherein the slice 126 can be part of the service network associated with the communication network, and wherein the slice 126 can relate to a service and/or application provided by the service network. In some embodiments, the slice component 118 can coordinate with the network slice component 122 of the service network to facilitate generating the slice 126 of the service network. The slice component 118 also can comprise, be associated with, and/or manage a mobile (e.g., local, internal) service network, wherein the mobile service network can comprise all or a desired portion of the applications and functionality (e.g., VNFs), scripts (e.g., code and other data for applications), data (e.g., data stored in the database component 128 (DB)), etc., of the service network associated with the communication network. In certain embodiments, based at least in part on the generating of the slice 126 in the service network, the slice component 118 can generate a corresponding slice 126' (e.g., a corresponding or internal (int.) service slice) in the mobile service network of the slice component 118, wherein the corresponding slice 126' can be the same or substantially the same as the slice 126 of the service network when there is a communication connection established between the slice component 118 and the communication network 102.

The slice component 118 also can coordinate with the network slice component 122 of the service network to facilitate generating a core slice 130 of the core network of the communication network 102. The slice component 118 also can comprise a mobile core network. In some embodiments, in connection with generating the core slice 130 of the core network, the slice component 118 can generate a corresponding core slice 130' (e.g., internal (int.) core slice) in the mobile core network of the slice component 118, wherein the corresponding core slice 130' can be the same or substantially the same as the core slice 130 of the core network when there is a communication connection established between the slice component 118 and the communication network 102.

As part of generating the slices 126 and 130 (and associated slices 126' and 130') and establishing the communication connection, the slice component 118 can create a secure communication channel between the communication device (e.g., 110) and the service network (e.g., a service network device of the service network) via the mobile network device 124, wherein the secure communication channel can be used to securely communicate information between the communication device (e.g., 110) and the service network via the mobile network device 124. The secure communication channel can enable secure communication of information between the communication device (e.g., 110) and the service network via the mobile network device 124, in accordance with applicable defined security criteria. The slice component 118 and/or the network slice component 122 can provide applications, such as VNFs, and other resources that can be utilized to create and provide the secure communication channel, in accordance with the applicable defined security criteria.

The defined security criteria can be based at least in part on the type of service and the security specifications and protocols associated with the service (e.g., service 106 or 108). For example, with regard to a healthcare-related service, the defined security criteria can relate to Health Insurance Portability and Accountability Act (HIPAA) specifications and protocols. The slice component 118 and/or the network slice component 122 can provide applications, such as VNFs, and other resources that can be utilized to create and provide a secure communication channel that is in compliance with HIPAA specifications and protocols, in accordance with the applicable defined security criteria. As another example, for a military-related service, the defined security criteria can relate to military specifications and protocols for communications (e.g., wireless communications of voice or data traffic). The slice component 118 and/or the network slice component 122 can provide applications, such as VNFs, and other resources that can be utilized to create and provide a secure communication channel that is in compliance with military specifications and protocols, in accordance with the applicable defined security criteria. Other respective security criteria (e.g., security criteria relating to law enforcement-related service, security criteria relating to an agricultural-related service, security criteria relating to a farming-related service, . . . ) relating to other respective specifications and protocols of other services can define the structure and security that the secure communication is to have in order to comply with the respective security criteria of the other services. The defined security criteria can be part of defined slice management criteria that can be employed to facilitate managing the creation and use of slices (e.g., service slices, internal service slices, core slices, internal core slices) by the slice component 118 and/or communication network 102 to facilitate securely communicating information (e.g., information relating to services) between the communication network 102 (e.g., services associated with the communication network 102) and the slice component 118 and associated communication devices (e.g., 110 and/or 112, . . . ) and/or between the slice component 118 and associated communication devices.

The slice component 118, employing the service slice 126 (and/or corresponding service slice 126') and core slice 130 (and/or corresponding core slice 130'), the mobile service network, and the secure communication channel, can provide (e.g., make available), facilitate providing, communicate, or facilitate communicating, all or a desired portion of the applications, functionality, resources, and/or information (e.g., service-related data, software or firmware updates, . . . ) associated with the service network (e.g., for the desired service of the service network) to the communication device (e.g., 110), via the secure communication channel, to facilitate enabling the communication device to utilize the desired service associated with the slice 126 in a desirably (e.g., optimally, suitably, or acceptably) secure environment. For instance, in addition to the VNFs and resources utilized to create the secure communication channel, the slice component 118 can provide, or facilitate providing, desired VNFs, resources, and/or information from the service network to the communication device (e.g., 110), via the secure communication channel to facilitate enabling the communication device to utilize the desired service, application, resources, functions, etc., and exchange information with the service network in a desirably secure environment. From the standpoint of the communication devices (e.g., 110, 112, . . . ), the slice component 118, and associated mobile service network and mobile core network, can essentially be viewed as the communication network 102 (e.g., the slice component 118, and associated mobile service network and mobile core network, can be part of the communication network 102).

For example, if the communication device (e.g., 110) is associated with (e.g., attached to, integrated with, stowed on) a tractor on a rural farm, and the service (e.g., 106) is a farming-related service associated with an entity that desires to collect information regarding the operation of the tractor and/or the area being farmed using the tractor, the communication device (e.g., 110) can obtain information (e.g., statistics, information relating to conditions associated with the farm or tractor, status information, . . . ) from sensors of or associated with the communication device and/or tractor and can communicate such information to the service network via the secure communication channel. The service network (e.g., the network slice component 122 associated with the service network) can store such information in the database component 128 or other desired data store. The slice component 118 also can store such information in a mobile database component 132 (MDB) (e.g., a virtual database) of the mobile service network to facilitate maintaining synchronization between the mobile service network (and mobile database component 132) and the service network (and database component 128).

As another example, if there is a software update or firmware update available, the service network (e.g., via the network slice component 122) can communicate information regarding the software update or firmware update to the communication device (e.g., 110) via the secure communication channel, and the software update or firmware update can be performed at the communication device. If there is data (e.g., service-related data) that the service network desires to communicate to the communication device (e.g., 110), the service network can communicate such data to the communication device via the secure communication channel.

In some embodiments, employing the slices, the slice component 118, via the mobile network device 124, can communicate with each of the communication devices (e.g., 110, 112, . . . ) to collect respective information from the respective communication devices to communicate to the service network, and communicate other respective information (e.g., service-related data, software or firmware updates, . . . ) from the service network to the respective communication devices. In other embodiments, one (or more) of the communication devices (e.g., communication device 110) can collect information from the other communication devices (e.g., communication device 112 and/or other communication devices). For example, the communication (e.g., 110) can engage in ad hoc communication with the other communication devices (e.g., communication device 112 and/or other communication devices). The communication device (e.g., 110), which collected the information from the other communication devices, can communicate its information and the information collected from the other communication devices to the service network via the secure communication channel enabled by employing the slices, the slice component 118, and the mobile network device 124. Other information to be sent to the communication devices can be communicated via the secure communication channel to the communication device (e.g., 110), and that communication device can distribute respective information to the other respective communication devices (e.g., communication device 112 and/or other communication devices).

As yet another illustrative example, it can be desirable (e.g., important, legally required, specified in policy or specifications, . . . ) to maintain certain data (e.g., vital data, sensitive data, private data, proprietary or secret data, medical data, military data, and/or law enforcement data, . . . ) within a secure network, and avoid, minimize, or prohibit moving such data to Wi-Fi or other less secure networks (e.g., as an interim access solution). Traditional techniques and networks can have limited and/or insufficient capabilities to desirably (e.g., optimally, suitably, or acceptably) secure such data within a secure network.

The disclosed subject matter can employ the enhanced techniques, systems, methods, techniques, as disclosed and described herein, to desirably maintain and/or communicate such data within a secure network (e.g., via a secure network channel). In accordance with various embodiments, the slice component 118 can create a slice (e.g., service slice 126) of a virtual network with all of the desired functions (e.g., VNFs, applications, . . . ) to enable the communication device (e.g., 110) and/or associated entity (e.g., 114), which can be a user, equipment, animal, or other entity, to securely login to the service network (and associated communication network 102), start a communication session with regard to the desired service (e.g., 106), generate the slice (e.g., service slice 126) of the service network (and corresponding core slice 130 of the core network), and securely communicate information (e.g., sensor data) to the slice (e.g., service slice 126) of the service network via the secure communication channel created for the slice. For instance, in the case of a healthcare service provider associated with the service (e.g., 106), the communication device (e.g., 110) can comprise or be associated with one or more sensors that can sense conditions associated with the entity (e.g., 114). The communication device (e.g., 110), using the secure communication channel associated with the slice (e.g., service slice 126), can securely communicate the sensor data relating to the sensed conditions to the service network (e.g., to the slice 126 of the service network) for secure storage in the database component 128 and/or secure access by the healthcare service provider, in accordance with the defined security criteria (e.g., HIPAA criteria). Thus, when an entity (e.g., patient) has or is provided a communication device (e.g., 110), the slice component 118 can provide the communication device (e.g., 110) and associated entity (e.g., 114) with the desired VNF applications to create an end-to-end slice (e.g., service slice 126) of the network within the device hardware of the communication device with the ability to have radio access (e.g., wireless communication access) to the communication network 102 (e.g., macro and/or small cell communication network), for example, when the slice component 118 is able to establish a communication connection with the communication network 102 and associated service network (e.g., as business as usual (BAU)). In an instance when a communication connection with the communication network 102 and associated service network is not able to be established (or is disrupted), the slice component 118 can continue the communication session using an internal slice (e.g., internal service slice 126'), can provide all or at least a portion of the functionality (e.g., VNF applications, resources, . . . ) and/or service-related information associated with the service (e.g., 106), can receive information from the communication device in connection with the service, and can store the received information in the mobile database component 132, as more fully described herein. Once the mobile network device 124 of the slice component 118 is able to connect or re-connect with the communication network 102 and associated service network, the slice component 118 can synchronize (e.g., securely synchronize via a secure communication channel) information relating to the communication session with the service network (e.g., information in the mobile database component 132 can be synchronized with information in the database component 128), as more fully described herein.

In some embodiments, the slice component 118 can generate or maintain, or facilitate generating or maintaining, (e.g., simultaneously or in parallel) multiple slices (e.g., multiple service slices, multiple core slices, multiple internal service slices, and/or multiple internal core slices) for respective communication devices (e.g., 110 and/or 112, . . . ) and/or respective services (e.g., 106 and/or 108, . . . ). For example, the slice component 118 can generate or maintain, or facilitate generating or maintaining, a first set of slices (e.g., first service slice, first core slice, first internal service slice, and/or first internal core slice) for a first communication device (e.g., 110) with regard to a first service (e.g., 106); and, simultaneously or in parallel with the first set of slices, can generate or maintain, or facilitate generating or maintaining, a second set of slices (e.g., second service slice, second core slice, second internal service slice, and/or second internal core slice) for a second communication device (e.g., 112) with regard to a second service (e.g., 108) or the first service (e.g., 106). As another example, the slice component 118 can generate or maintain, or facilitate generating or maintaining, a first set of slices (e.g., first service slice, first core slice, first internal service slice, and/or first internal core slice) for the first communication device (e.g., 110) with regard to a first service (e.g., 106); and, simultaneously or in parallel with the first set of slices, can generate or maintain, or facilitate generating or maintaining, a second set of slices (e.g., second service slice, second core slice, second internal service slice, and/or second internal core slice) for the first communication device (e.g., 110) with regard to a second service (e.g., 108).

In some instances, the slice component 118 and associated mobile network device 124 may not be able to establish a communication connection with the communication network 102, or may lose a communication connection with the communication network, for example, due to problems with the communication network 102, interference between the mobile network device 124 and the communication network 102 (e.g., the network node device 104 of or associated with the communication network 102), and/or other issues. The disclosed subject matter can mitigate or overcome such issues, as the slice component 118, employing the mobile service network and mobile core network, can operate in place of, and can provide all or at least virtually all of the services, applications, functions, and resources of the service network, to the communication devices (e.g., 110, 112, . . . ) via the mobile service network of the slice component 118.

For instance, in response to determining that the mobile network device 124 is unable to establish a communication connection with the communication network 102 or determining that a communication connection between the mobile network device 124 and the communication network 102 has been lost (e.g., has dropped, failed, or otherwise been disconnected), the slice component 118, and associated mobile service network and mobile core network, can start a communication session (in the former case) or can continue a communication session (in the latter case), acting on behalf of, or in place of, the communication network 102 and associated service network and core network. With regard to a new communication session, the slice component 118, employing the mobile network device 124 of the mobile (e.g., local, internal) core network, can establish a communication connection between the communication device (e.g., 110) and the mobile network device 124. With regard to an ongoing communication session, the slice component 118, employing the mobile network device 124, can maintain the communication connection between the communication device (e.g., 110) and the mobile network device 124.

The slice component 118 can generate (or maintain) an internal slice, such as slice 126', associated with the mobile service network, wherein the internal slice 126' can be part of the mobile service network, which can be associated with the mobile network device 124. The slice component 118 also can generate or facilitate generating (or maintaining) a corresponding internal core slice, such as core slice 130', of the mobile core network associated with the mobile network device 124. The slice component 118, employing the internal slice 126' and the internal core slice 130', can facilitate creating a secure communication channel, based at least in part on (e.g., in accordance with) the applicable defined security criteria relating to the service (e.g., 106 or 108) that the communication device (e.g., 110) desires to access and utilize.

The slice component 118 can maintain all or a desired portion of the information of the database component 128 of the service network in the mobile database component 132 of the mobile service network to enable the slice component 118 to be able to provide all, virtually all, or at least most of the service features, service-related applications (e.g., VNF applications), service-related functions, service-related data, etc., of the service(s) (e.g., 106 or 108) desired by the communication device (e.g., 110). In accordance with various embodiments, the mobile database component 132 can be a full (or at least substantially full) version, or a "light" version, of the database component 128, wherein the "light" version can include a desired portion (e.g., a significant portion, but not all) of the information stored in the database component 128. The slice component 118 (e.g., the mobile service network of or associated with the slice component 118) can comprise all or a desired portion of the applications and functionality (e.g., VNFs), scripts (e.g., code and other data for applications), and/or other information of the service network associated with the communication network 102. From the perspective of the communication devices (e.g., 110, 112, . . . ), the slice component 118 and associated mobile service network, mobile core network, mobile database component 132, etc., essentially can be and act like the communication network 102 and associated service network, core network, database component 128, etc.

Utilizing the internal slice 126' and associated internal core slice 130', information can be communicated, via the secure communication channel and mobile network device 124, from the communication device (e.g., 110) to the mobile service network of the slice component 118. Such information can comprise, for example, information relating to the service (e.g., 106, or 108, . . . ) and/or entity (e.g., 114) associated with the communication device (e.g., 110). When the communication device (e.g., 110) is coordinating with and/or acting on behalf of other communication devices (e.g., 112) associated with other entities (e.g., 116), such information also can comprise other information obtained from such other communication devices (e.g., 112) associated with such other entities (e.g., 116). The slice component 118 can store the information, which is received from the communication device (e.g., 110) (or other communication device(s)), in the mobile database component 132 associated with the mobile service network or other desired data store, as applicable and appropriate.

In some embodiments, the mobile service network of the slice component 118 can have a software update(s), a firmware update(s), and/or other data (e.g., service-related data), associated with the service (e.g., 106, or 108, . . . ) being accessed by the communication device (e.g., 110), stored in the mobile database component 132 or other data store of the slice component 118. Utilizing the internal slice 126' and associated internal core slice 130', the slice component 118 can communicate, via the secure communication channel and mobile network device 124, the software update(s), firmware update(s), and/or other data to the communication device (e.g., 110). The communication device (e.g., 110) can perform the software update(s) and/or firmware update(s), and/or can utilize or process the other data as appropriate. If the mobile service network does not have such software update(s), firmware update(s), and/or other data available to it (e.g., stored in the mobile database component 132 or other data store), such update(s) and/or other data can be communicated to the communication device (e.g., 110) when the communication connection (and secure communication channel) is established or re-established with the communication network 102 and associated service network and core network.

The slice component 118 and/or mobile network device 124 can monitor the communication network 102 and/or communication conditions in connection with attempting to establish or re-establish a communication connection with the communication network 102. Based at least in part on the monitoring (and/or, e.g., the results of analyzing data relating to communication conditions associated with the communication network 102), at some point in time, the slice component 118, employing the mobile network device 124, can determine that a communication connection can be established or re-established between the mobile network device 124 and the communication network 102 (e.g., macro and/or small cell communication network) and associated service network and core network, as well as services (e.g., 106, or 108, . . . ) and associated applications. For example, the movable component 120 (e.g., a vehicle, or motorized or movable device) associated with the slice component 118 can move to a location where the mobile network device 124 is able to connect to the communication network 102 and/or interference that was inhibiting connection between the mobile network device 124 and the communication network 102 can be mitigated, reduced, or removed (e.g., whether or not the movable component 120 moves to a different location). In response to determining that a communication connection can be established or re-established between the mobile network device 124 and the communication network 102, the slice component 118 can establish or re-establish the communication connection (e.g., wireless communication connection), including a secure communication channel, between the mobile network device 124 and the communication network 102 and associated service network, core network, services, etc., and/or between the communication device (e.g., 110) and the communication network 102 and associated service network, core network, services, etc. (e.g., if the communication session of the communication device (e.g., 110) is still in progress)).

In connection with establishing or re-establishing the communication connection with the communication network 102, the slice component 118 (e.g., coordinating with the network slice component 122) can facilitate generating the slice 126 and associated core slice 130, as more fully described herein. If the communication session, which had been using the internal slice 126', is still in progress, the communication session can continue using the internal slice 126' (e.g., internal service slice) and associated internal core slice 130', in conjunction with using the slice 126 and associated core slice 130. The network slice component 122 can comprise, be associated with, and/or manage the service network, wherein the service network can comprise the applications and functionality (e.g., VNFs), scripts (e.g., code and other data for applications), information (e.g., information stored in the database component 128), services (e.g., 106, 108, . . . ), etc., of the service network.

With regard to the communication session (or portion of the communication session) that was occurring while the slice component 118 (and communication device (e.g., 110) was not connected to the communication network 102, in response to establishing or re-establishing the communication connection and secure communication channel with the communication network 102, the slice component 118, employing the mobile network device 124 and the secure communication channel, can facilitate communicating information relating to the communication session (or portion thereof) associated with the communication device (e.g., 110) to the service network, and/or receiving other information from the service network for storage in the mobile service network (e.g., mobile database component 132 or other data store) and/or for communication to the communication device, to synchronize information between the service network (e.g., the database component 128 of the service network) and the mobile service network (e.g., the mobile database component 132 of the mobile service network) and/or to provide the other information, or a portion thereof, to the communication device (e.g., 110) in connection with the communication session. Such other information can be determined (e.g., by the network slice component 122), for example, based at least in part on (e.g., in response to) the information relating to the communication session (or portion thereof) communicated to the service network and/or the results of analyzing the information relating to the communication session.

The disclosed subject matter (e.g., employing the slice component 118 and other components, as described herein) can employ enhanced techniques, systems, and methods that can facilitate desirably providing communication coverage and/or advanced capabilities (e.g., network slicing) in underserved or unserved areas, providing desirably secure communication of information relating to services (e.g., wherein a communication device does not have to leave the communication/service network, which can facilitate secure communication of information between the communication device and service network), and providing desirable (e.g., suitable, applicable, or optimal) data and communication security with respect to a particular service (e.g., healthcare-related service, military-related service, law enforcement-related service, . . . ), as more fully described herein. For instance, in some embodiments, with regard to certain security situations and/or services or entities that can desire relatively high security of data in the network, the slice component 118 and other components of the system 100 can employ desirably secure triplet and quadruple security functions and measures to secure data associated with the service network, in accordance with the applicable defined security criteria. The disclosed subject matter can be a cost-effective solution to dynamically extend network coverage (e.g., communication and/or service network coverage) on demand for at least a certain desirable amount of time.

Figure 2:
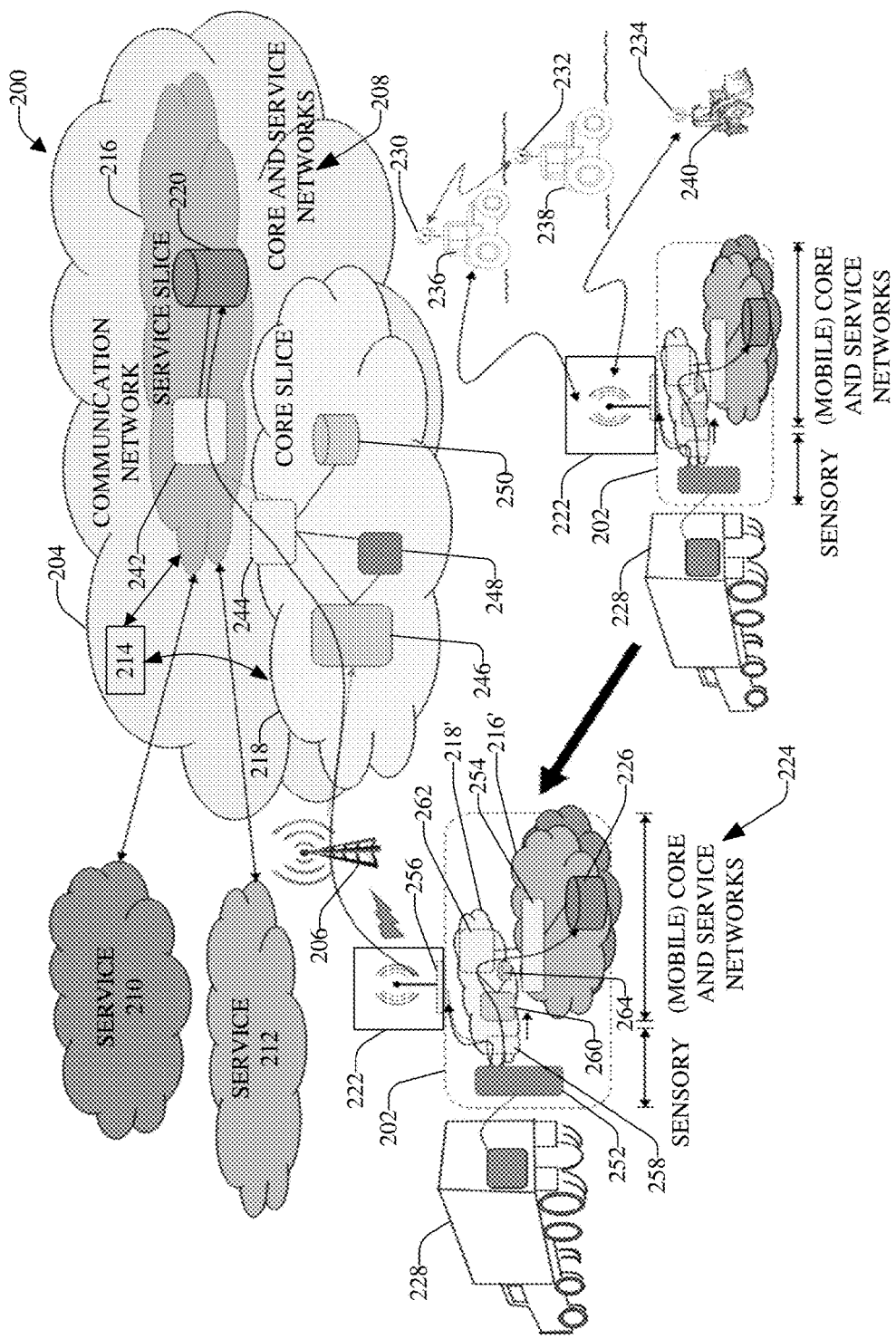
FIG. 2 illustrates a block diagram of another example, non-limiting system that can generate and manage slices of a service network for communication devices, in accordance with one or more embodiments described herein.

Referring to FIG. 2, FIG. 2 illustrates a block diagram of another example, non-limiting system 200 that can generate and manage slices of a service network for communication devices, in accordance with one or more embodiments described herein. The system 200 can comprise a slice component 202 and a communication network 204 that can be associated with the slice component 202, at least at certain times, via the network node device 206 (e.g., base station, nodeB, eNodeB, or gNB).

The communication network 204 can comprise the core and service networks 208. The communication network 204 (e.g., the service network of the communication network 204) can be associated with and/or can provide various services, including service 210 and service 212, and associated applications, such as those disclosed herein. The communication network 204 also can comprise a network slice component 214 that can communicate and coordinate with the slice component 202 to generate service slices, such as service slice 216, and core slices, such as core slice 218, as more fully described herein, wherein the service slices and core slices can be associated with the network slice component 214. The service slices, such as service slice 216, also can include or be associated with (e.g., communicatively connected to) database components, such as a database component 220.

The slice component 202 can comprise a mobile network device 222. The slice component 202 also can comprise mobile core and service networks 224. The slice component 202 can generate internal service slices, such as internal service slice 216', and internal core slices, such as internal core slice 218', as more fully described herein. The internal service slices, such as internal service slice 216', can comprise or be associated with mobile database components, such as mobile database component 226. In some embodiments, the mobile database component 226 can be a virtual database. The slice component 202 further can be associated with a movable component 228 that can be employed to move the slice component 202 to various desired locations to enable the slice component 202 to connect and communicate with communication devices, such as communication devices 230, 232, and/or 234, when the movable component 228 moves the slice component 202 to a location that is in proximity to the slice component 202, as more fully described herein.

The respective components (e.g., slice component 202, communication network 204, network node device 206, core and service networks 208, network slice component 214, service slice 216, core slice 218, database component 220, mobile network device 222, mobile core and service networks 224, internal service slice 216', internal core slice 218', mobile database component 226, movable component 228, communication devices (e.g., 230, 232, and/or 234), . . . ) of the system 200 respectively can be the same as or similar to, and/or can comprise the same or similar functionality as, respectively named components, such as more fully described herein. In FIG. 2, the movable component 228 is illustrated as being a truck. However, it is to be appreciated and understood that the movable component 228 can be virtually any desired movable component (e.g., motorized vehicle, unmotorized vehicle, motorized device, . . . ) that can be associated with the slice component 202 to move the slice component 202 to desired locations, as more fully described herein.

Also, as depicted in FIG. 2, the communication device 230 is depicted as being associated with entity 236 (e.g., a tractor), the communication device 232 is depicted as being associated with entity 238 (e.g., another tractor), and the communication device 234 is depicted as being associated with entity 240 (e.g., a bulldozer). However, it is to be appreciated and understood that the respective entities (e.g., 236, 238, 240) can be different entities from those entities (e.g., tractor, other tractor, bulldozer) depicted in FIG. 2, and the respective entities (e.g., 236, 238, 240) can be virtually any desired type of entity (e.g., user, vehicle, equipment, or animal), such as more fully described herein.

The communication network 204 can comprise an Internet Protocol (IP) multimedia subsystem (IMS) core component 242 (also referred to as an IP multimedia core network subsystem) that can facilitate providing multimedia services. When the service slice 216 is generated, the service slice 216 can comprise or be associated with the IMS core component 242. The IMS core component 242 can be associated with the database component 220 to facilitate providing the services (e.g., 210, or 212, . . . ) and/or data (e.g., service-related data) relating to the services.

The communication network 204 also can include a common C-plane selection function (CCPSF) 244 that can be associated with or part of a common plane (CP) function. When the core slice 218 is generated, the core slice 218 can comprise or be associated with the CCPSF 244. The CCPSF 244 also can be associated with (e.g., communicatively connected to) the IMS core component 242. The CCPSF 244 can be employed to facilitate determining with which common C-plane function that the network node device 206 is to communicate. The CCPSF 244 can determine the common C-plane function, for example, based at least in part on a profile (e.g., user or subscription profile) associated with the communication device (e.g., 230). If the common C-plane function is to be changed, the CCPSF 244 (e.g., serving CCPSF) can facilitate determining or re-selecting another (e.g., a target) common C-plane function.

The communication network 204 further can comprise a mobility management function (MM) 246 that can be associated with (e.g., communicatively connected to) the CCPSF 244. When the core slice 218 is generated, the core slice 218 can comprise or be associated with the MM 246. The MM 246 can be utilized to facilitate registration of communication devices (e.g., 230, 232, and/or 234) in an operator's network and also can provide mobility support for communication devices, such as providing mobility function and/or other support when a communication device is moving between base stations within an operator's communication network.

The communication network 204 also can include an authentication function (AU) 248 (which also can be referred to as an authentication service function (AUSF)) that can be associated with (e.g., communicatively connected to) the MM 246 and/or the CCPSF 244. When the core slice 218 is generated, the core slice 218 can comprise or be associated with the AU 248. The AU 248 can be employed to authenticate or authorize (e.g., grant authorization to) a communication device (e.g., 230) to connect or attach to an operator's network. The AU 248 also can provide or facilitate providing security and/or integrity services or protections for non-access stratum (NAS) signaling.

In some embodiments, the communication network 204 can comprise a unified data management (UDM) component 250 that can be associated with (e.g., communicatively connected to) the CCPSF 244 and/or other components of the communication network 102. When the core slice 218 is generated, the core slice 218 can comprise or be associated with the UDM component 250. The UDM component 250 can store subscriber data and/or profiles of subscribers (e.g., users of communication devices). The CCPSF 244 can access a profile associated with a subscriber to facilitate determining with which common C-plane function the network node device 206 is to communicate.

With further regard to the slice component 202, the slice component 202 can comprise a sensory unit 252 that can instantiate or facilitate instantiating the core slice(s) (e.g., internal core slice 218' and core slice 218), the service slice(s) (e.g., internal service slice 216' and service slice 216), the core functions and capabilities, the VNF 254 (also referred to as the service VNF) for the service(s) (e.g., service 210, and/or service 212, . . . ), and/or other functions. When the VNF 254 is instantiated, the information (e.g., service-related data, software, firmware, . . . ) relating to the service and associated applications (e.g., VNF) can be stored in the mobile database component 226.

The mobile network device 222 of the slice component 202 can comprise various network components (e.g., network node components) or other network components, including, for example, remote radio head (RRH) component 256 (also referred to as remote radio unit or remote radio component), which can be a remote radio transceiver that can connect (e.g., wirelessly and communicatively connect) to the network node device 206 to facilitate connecting to the communication network 204 (e.g., connecting the slice component 202 to the communication network 204). The RRH component 256 can enable the slice component 202 to connect and communicate with the communication network 204 when the slice component 202 is located in underserved or unserved areas that otherwise would not have access to, or would only have limited access to, the communication network 204, as more fully described herein. The RRH component 256 also can connect (e.g., wirelessly and communicatively connect) to the communication devices (e.g., 230, 232, and/or 234, . . . ) that are in a coverage area served by the RRH component 256, which can enable the communication devices to communicate with the slice component 202 and access the services (e.g., 210, and/or 212, . . . ) associated therewith. The RRH component 256 also can be associated with the sensory unit 252 to facilitate enabling the sensory unit 252 to instantiate the core slice(s), the service slice(s), the core functions and capabilities, the VNF 254 for the service(s), and/or other functions.

The slice component 202 can comprise a baseband unit (BBU) 258 that can be associated with the sensory unit 252 and RRH component 256. The BBU 258 can be part of the mobile core network of the slice component 202. When the internal core slice 218' is generated, the internal core slice 218' can comprise or be associated with the BBU 258. The BBU 258 can be a baseband processing unit of the slice component 202, and can facilitate communication and/or managing communication through the physical interface.

The BBU 258 can facilitate modulating data packets (e.g., IP packets) received from the mobile core network of the slice component 202 to generate digital baseband signals that can be communicated to the RRH component 256. The BBU 258 also can facilitate demodulating digital baseband signals received from the RRH component 256 to obtain the data packets associated with the digital baseband signals, and can communicate the data packets to the mobile core network of the slice component 202.

The slice component 202 also can include a mobility management entity (MME) 260 that can be associated with the BBU 258. The MME 260 can be part of the mobile core network of the slice component 202. When the internal core slice 218' is generated, the internal core slice 218' can comprise or be associated with the MME 260. The MME 260 can facilitate enabling the control plane to communicate with the mobile core network of slice component 202. The MME 260 can manage or facilitate managing communications with the communication devices (e.g., 230, 232, and/or 234, . . . ), including managing access of the communication devices to the mobile core network of the slice component 202 to gain connectivity (e.g., IP connectivity). The MME 260 also can be employed to initiate or facilitate performing or managing paging, authentication, and/or authorization of the communication devices (e.g., 230, 232, and/or 234, . . . ). The MME 260 also can facilitate managing mobility management for the communication devices (e.g., 230, 232, and/or 234, . . . ) with regard to network node devices (e.g., 206).

The slice component 202 further can comprise a packet data network (PDN) component 262 that can be associated with the MME 260, the service VNF 254, and/or the internal service slice 216'. The PDN component 262 can be part of the mobile core network of the slice component 202. When the internal core slice 218' is generated, the internal core slice 218' can comprise or be associated with the PDN component 262. The PDN component 262 can facilitate providing data services, and facilitate the communication of data using data packets, for the mobile core network of the slice component 202. In some embodiments, the PDN component 262 can comprise a PDN gateway component that can be utilized to act as an interface between different packet data networks (e.g., mobile core network of the slice component 202 (e.g., mobile core network of an LTE system) and an IP-based network or other network).

The slice component 202 also can include a script database component 264 that can be associated with (e.g., communicatively connected to) the MME 260 and/or other components of the slice component 202. The script database component 264 can be part of the mobile core network of the slice component 202. When the internal core slice 218' is generated, the internal core slice 218' can comprise or be associated with the script database component 264. The script database component 264 can comprise scripts for one or more services (e.g., service 210, and/or service 212, . . . ) that can be associated with the slice component 202 (e.g., one or more services with which the slice component 202 can communicate). The slice component 202 (e.g., the MME 260 or other component of the slice component 202) can access the script database component 264 to access or obtain a script for a service (e.g., service 210), and can generate or facilitate generating the internal service slice 216' and/or service slice 216 for the service based at least in part on the script for the service.

Figure 3:
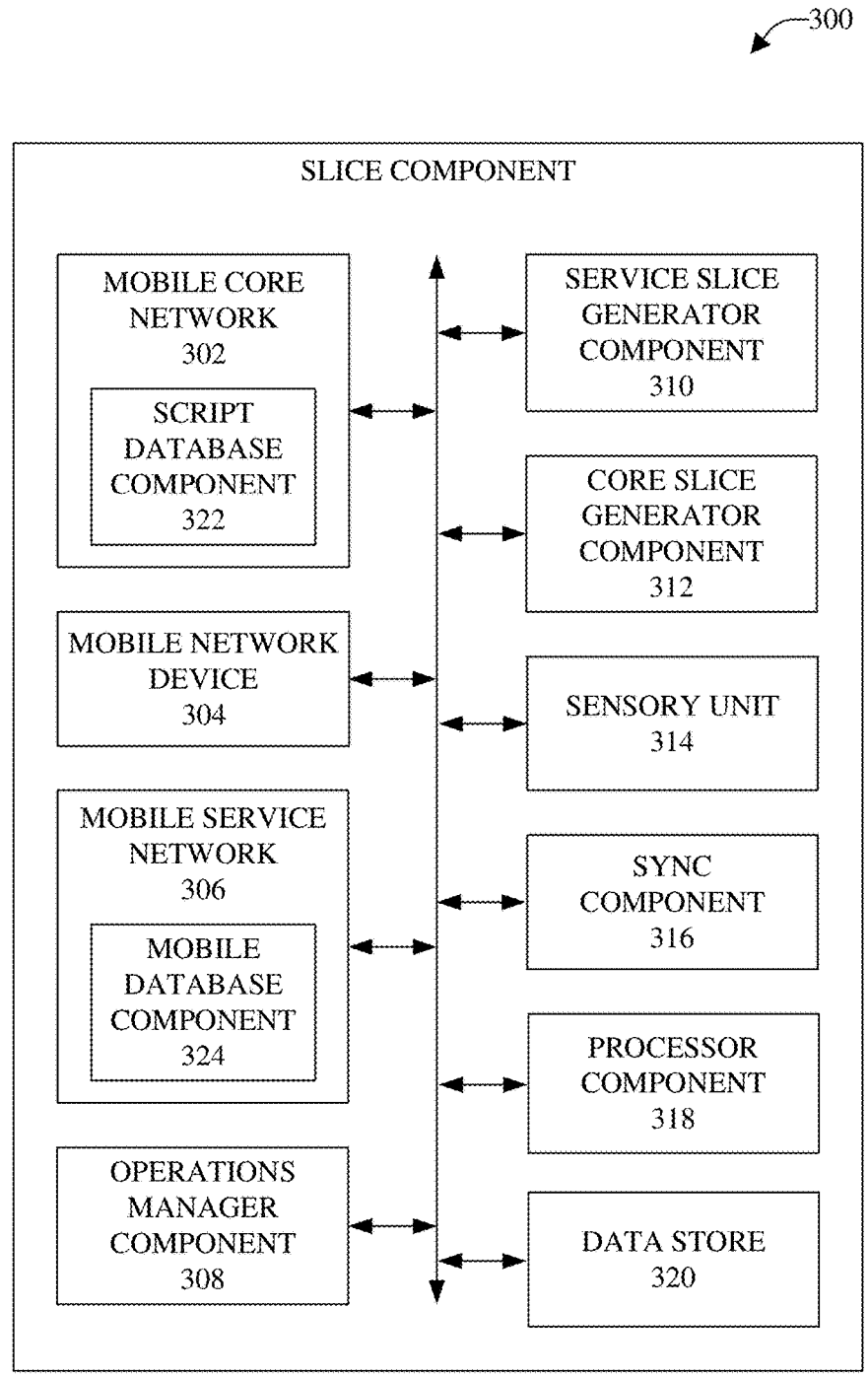
FIG. 3 depicts a block diagram of an example, non-limiting slice component, in accordance with various aspects and embodiments of the disclosed subject matter.

FIG. 3 depicts a block diagram of an example, non-limiting slice component 300, in accordance with various aspects and embodiments of the disclosed subject matter. The slice component 300 can comprise a mobile core network 302, a mobile network device 304, a mobile service network 306, an operations manager component 308, a service slice generator component 310, a core slice generator component 312, a sensory unit 314, a synchronization component 316 (sync component), a processor component 318, and a data store 320.

The mobile core network 302 can comprise various components that can be employed to facilitate providing core functions and capabilities of the mobile core network to facilitate enabling communication devices to communicate (e.g., wirelessly communicate) with the slice component 300 and enabling the slice component 300 to communicate with other devices (e.g., network node devices of a communication network). The components of the mobile core network 302 can comprise routers, nodes, switches, interfaces, controllers, and/or gateways, etc., that can be arranged and configured to form the mobile core network 302, and can facilitate communication of data between the slice component 300 and the communication devices, and/or communication of data between the slice component 300 and network node devices of the communication network. In some embodiments, the components of the mobile core network 302 can comprise a BBU, an MME, and/or a PDN. In certain embodiments, one or more of the various components of the mobile core network 302 can be virtual components.

In some embodiments, the mobile core network 302 can comprise a script database component 322 that can store one or more scripts for one or more services that can be associated with the slice component 202 and/or communication network. The slice component 300 can access the script database component 322 to access or obtain a script for a service, wherein the service slice generator component 310 can generate an internal service slice associated with a service and/or or facilitate generating (e.g., in coordination with the network slice component) a service slice associated with the service based at least in part on the script for the service.

The mobile core network 302 can be associated with (e.g., can be communicatively connected to or can comprise) a mobile network device 304 that can enable the slice component 300 to connect and communicate (e.g., wirelessly connect and communicate) with communication devices in the coverage area served by the mobile network device 304 and network node devices associated with the communication network (e.g., macro and/or small cell communication network). In some embodiments, the mobile network device 304 can be or can comprise and RRH component that can be a remote radio transceiver that can connect (e.g., wirelessly and communicatively connect) to a network node device (e.g., base station, eNode, eNodeB, or gNB) of a communication network to facilitate connecting the slice component 300 to the communication network. The mobile network device 304 (e.g., employing the RRH component) can enable the slice component 300 to connect and communicate with the communication network when the slice component 300 is located in underserved or unserved areas (e.g., typically underserved or unserved by the communication network), as more fully described herein. The mobile network device 304 also can connect (e.g., wirelessly and communicatively connect) to communication devices that are located in a coverage area served by the mobile network device 304, which can enable the communication devices to communicate with the slice component 300 and access the services that can be provided via the slice component 300. The mobile network device 304 (e.g., the RRH component of the mobile network device 304) also can be associated with the sensory unit 314 to facilitate enabling the sensory unit 314 to instantiate core slices, the service slices, the core functions and capabilities of the mobile core network 302, the VNFs for services, and/or other functions.

The mobile service network 306 can comprise various components that can be employed to facilitate providing one or more services of or associated with the mobile service network 306. In some embodiments, one or more of the various components of the mobile service network 306 can be virtual components. The mobile service network 306 can comprise a mobile database component 324 that can be part of or associated with a service slice generated by the service slice generator component 310, wherein the service slice can be associated with a service that can be provided by the mobile service network 306 or the service network of the communication network (e.g., macro and/or small cell communication network). The mobile database component 324 can be created, for example, in response to generating the service slice associated with the service. In some embodiments, the mobile database component 324 can be a virtual database. The mobile database component 324 can store information (e.g., service-related data, software, software updates, firmware, firmware updates, VNF-related information, . . . ) relating to the service. For instance, the mobile database component 324 can store service-related data received from a communication device associated with an entity that is accessing or utilizing the service. The mobile database component 324 also can store service-related data, a software update(s), a firmware update(s), and/or VNF-related information, associated with the service that can be received from the service via the service network of the communication network. The slice component 300 can retrieve the service-related data, software update(s), and/or firmware update(s) from the mobile database component 324 and can communicate the service-related data, software update(s), and/or firmware update(s) to the communication device (or can forward the service-related data, software update(s), and/or firmware update(s) received from the communication network to the communication device). The slice component 300 also can provide VNFs associated with a service to the communication device based at least in part on the VNF-related information.

The operations manager component 308 can control (e.g., manage) operations associated with the slice component 300. For example, the operations manager component 308 can facilitate generating instructions to have components of the slice component 300 perform operations, and can communicate respective instructions to respective components (e.g., components of the mobile core network 302, the mobile network device 304, components of the mobile service network 306, service slice generator component 310, core slice generator component 312, sensory unit 314, synchronization component 316, processor component 318, data store 320, . . . ) of the slice component 300 to facilitate performance of operations by the respective components of the slice component 300 based at least in part on the instructions, in accordance with the defined slice management criteria, the defined security criteria, the defined slice management algorithm(s), and/or the defined security algorithm(s) (e.g., slice management algorithms and/or the defined security algorithms as disclosed, defined, recited, or indicated herein by the methods, systems, and techniques described herein). The operations manager component 308 also can facilitate controlling data flow between the respective components of the slice component 300 and controlling data flow between the slice component 300 and another component(s) or device(s) (e.g., communication device, base station or other network node component or device of the communication network, communication network, . . . ) associated with (e.g., connected to) the slice component 300.

The service slice generator component 310 can be employed to generate or facilitate generating service slices associated with services to enable communication devices (e.g., communication devices in underserved or unserved areas) in proximity to the slice component 300 to access desired services. The service slice generator component 310 can generate an internal service slice associated with a service or facilitate generating a service slice associated with the service (e.g., at the service network of the communication network) based at least in part on a script associated with the service (e.g., a script retrieved from the script database component 322), in accordance with the defined slice management criteria and the defined security criteria relating to the service.

The core slice generator component 312 can be utilized to generate or facilitate generating core slices in connection with service slices associated with services to facilitate enabling communication devices (e.g., communication devices in underserved or unserved areas) in proximity to the slice component 300 to access desired services. The core slice generator component 312 can generate an internal core slice of the mobile core network or facilitate generating a core slice of the core network of the communication network, in accordance with the defined slice management criteria and the defined security criteria relating to the service being accessed.

The sensory unit 314 can instantiate or facilitate instantiating a core slice(s) (e.g., internal core slice and/or core slice), a service slice(s) (e.g., internal service slice and/or service slice), core functions and capabilities, one or more VNFs for a service, and/or other functions. When a VNF is instantiated, the information (e.g., service-related data, software, firmware, . . . ) relating to the service and associated applications (e.g., VNF) can be stored in the mobile database component 324.

The synchronization component 316 can synchronize information between the slice component 300 and the communication network. With regard to a communication component accessing or attempting to access a service associated with the communication network, there can be instances where the slice component 300 is not able to establish a communication connection with the communication network or where a communication connection between the slice component 300 and the communication network is interrupted, lost, or otherwise discontinued. In such instances, the slice component 300 is able to provide the communication device all or a portion of the service and associated applications, functions, resources, etc., even though the slice component 300 is not connected to the communication network and associated service network, as more fully described herein.

While not connected to the communication network, the slice component 300 can employ the service slice generator component 310 to generate an internal slice for the service, and the core slice generator component 312 can generate a corresponding internal core slice in connection with the service to facilitate providing all or a portion of the service, creating a secure communication channel between the slice component 300 and communication device with regard to providing all or a portion of the service, communicating information in connection with the service between the slice component 300 and communication device, etc., as more fully described herein. For instance, during the communication session, the slice component 300 can obtain information (e.g., service-related data) from the communication device and/or can provide all or at least a portion of the service (e.g., functions, applications, VNFs, service-related data, . . . ) to the communication device.

With regard to the communication session (or portion of the communication session) that was occurring while the slice component 300 (and communication device) was not connected to the communication network, in response to establishing or re-establishing the communication connection and secure communication channel with the communication network, the synchronization component 316, employing the mobile network device 304 and a secure communication channel, can facilitate communicating information relating to the communication session (or portion thereof) associated with the communication device (to the service network associated with the communication network, and/or receiving other information from the service network for storage in the mobile service network 306 (e.g., mobile database component 324 or other data store) for communication to the communication device, to synchronize information between the service network (e.g., the database component of the service network) and the mobile service network 306 (e.g., the mobile database component 324 of the mobile service network 306) and/or to provide the other information, or a portion thereof, to the communication device in connection with the communication session.

The processor component 318 can work in conjunction with the other components (e.g., mobile core network 302, mobile network device 304, mobile service network 306, operations manager component 308, service slice generator component 310, core slice generator component 312, sensory unit 314, synchronization component 316, and/or data store 320, . . . ) to facilitate performing the various functions of the slice component 300. The processor component 318 can employ one or more processors, microprocessors, or controllers that can process data, such as information relating to communication devices (e.g., UEs), parameters relating to data communications, communication sessions, signaling, services, service slices, core slices, applications, VNFs, defined slice management criteria, defined security criteria, traffic flows, policies, algorithms (e.g., slice management algorithm(s), security algorithm(s)), protocols, interfaces, tools, and/or other information, to facilitate operation of the slice component 300, as more fully disclosed herein, and control data flow between the slice component 300 and other components (e.g., mobile devices (e.g., communication device), other network devices (e.g., network node devices) of the communication network, data sources, applications, . . . ) associated with the slice component 300.

The data store 320 can store data structures (e.g., user data, metadata), code structure(s) (e.g., modules, objects, hashes, classes, procedures) or instructions, information relating to communication devices (e.g., UEs), parameters relating to data communications, communication sessions, signaling, services, service slices, core slices, applications, VNFs, defined slice management criteria, defined security criteria, traffic flows, policies, algorithms (e.g., slice management algorithm(s), security algorithm(s)), protocols, interfaces, tools, and/or other information, to facilitate controlling operations associated with the slice component 300. In an aspect, the processor component 318 can be functionally coupled (e.g., through a memory bus) to the data store 320 in order to store and retrieve information desired to operate and/or confer functionality, at least in part, to the mobile core network 302, mobile network device 304, mobile service network 306, operations manager component 308, service slice generator component 310, core slice generator component 312, sensory unit 314, synchronization component 316, and/or data store 320, etc., and/or substantially any other operational aspects of the slice component 300.

It should be appreciated that the data store 320 described herein can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 4:
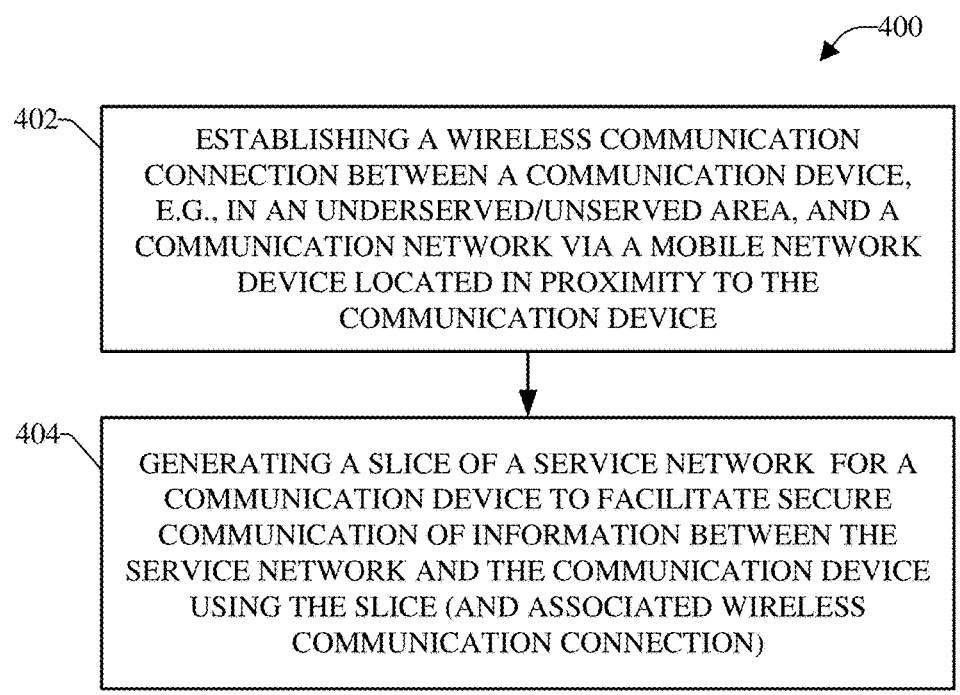
FIG. 4 illustrates a flow diagram of an example, non-limiting method that can generate and manage a slice of a service network for a communication device, in accordance with various aspects and embodiments of the disclosed subject matter.
Figure 5:
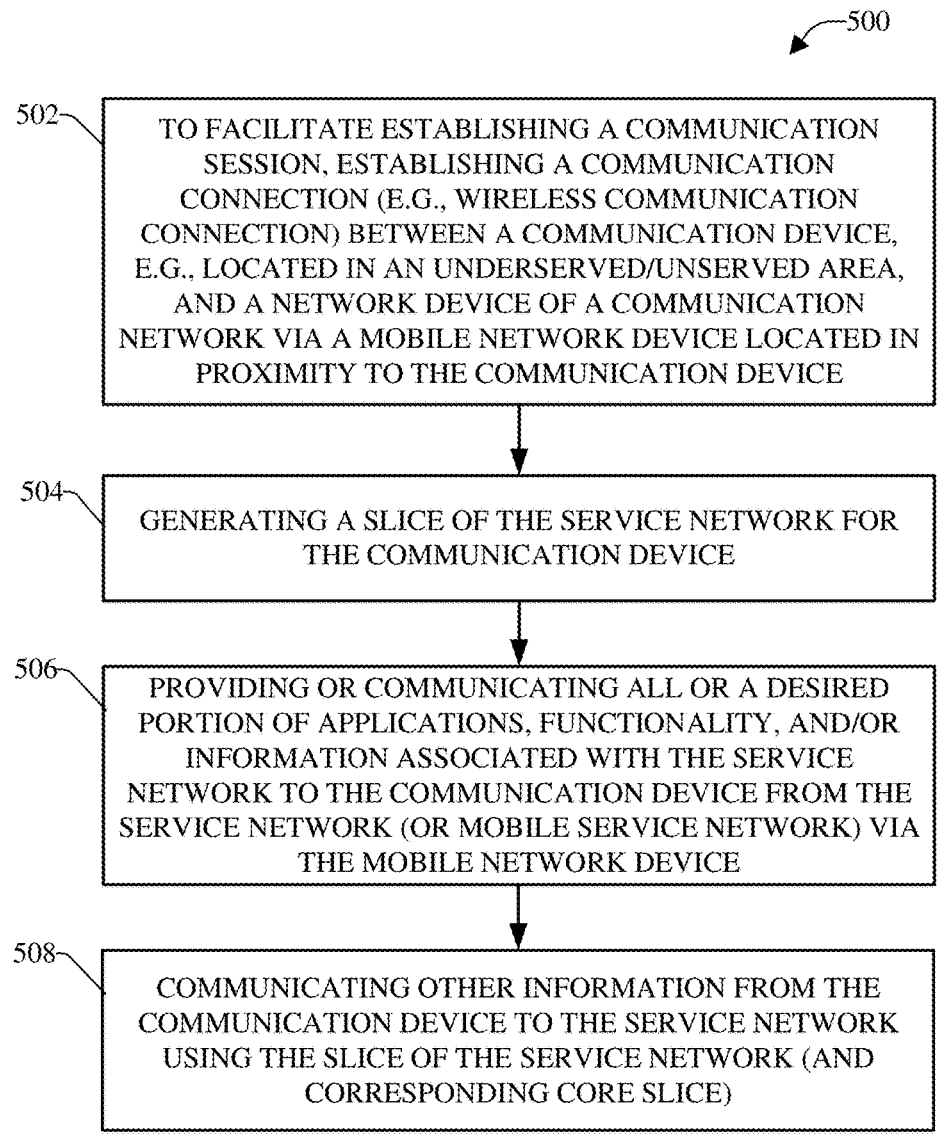
FIG. 5 depicts a flow diagram of another example, non-limiting method that can generate and manage a slice of a service network for a communication device, in accordance with various aspects and embodiments of the disclosed subject matter.
Figure 6:
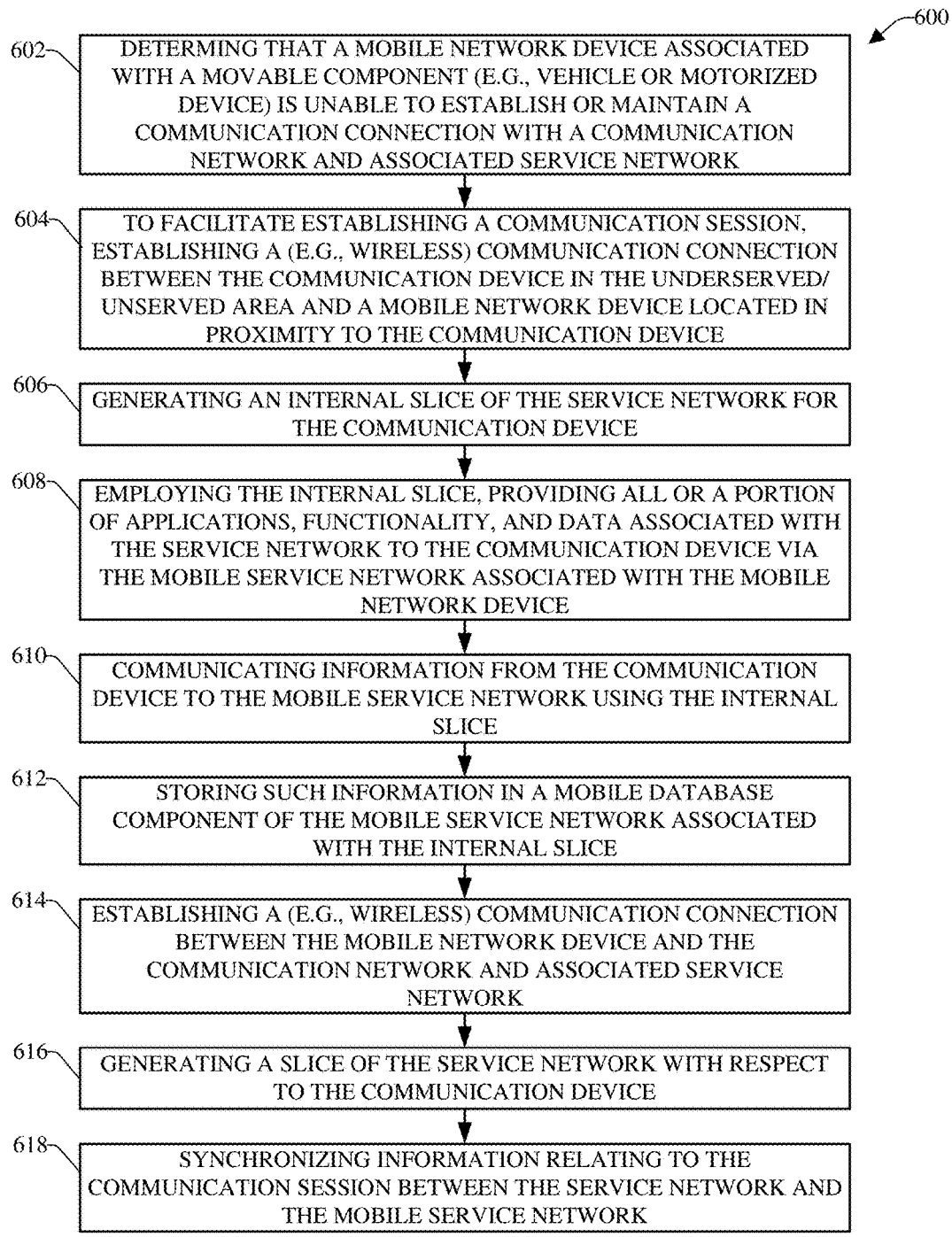
FIG. 6 illustrates a flow diagram of an example, non-limiting method 600 that, for a communication device, can generate and manage an internal slice of a local service network associated with a local (e.g., mobile) communication network associated with a vehicle or movable device, and synchronize information between the local service network and a service network of a communication network, in accordance with various aspects and embodiments of the disclosed subject matter.

In view of the example systems and/or devices described herein, example methods that can be implemented in accordance with the disclosed subject matter can be further appreciated with reference to flowchart in FIGS. 4-6. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 4 illustrates a flow diagram of an example, non-limiting method 400 that can generate and manage a slice of a service network for a communication device, in accordance with various aspects and embodiments of the disclosed subject matter. The method 400 can be implemented by a slice component that can comprise or be associated with a processor a memory. Alternatively, or additionally, a machine-readable storage medium can comprise executable instructions that, when executed by a processor, facilitate performance of operations for the method 400.

At 402, a wireless communication connection can be established between a communication device, for example, in an underserved/unserved area, and a communication network via a mobile network device (e.g., mobile network node device, movable network device) located in proximity to the communication device. The communication device can be located, for example, in an underserved/unserved area (e.g., rural or pastoral area) where typically there can be limited or no wireless communication coverage available to provide wireless communication services to communication devices, such as the communication device, to enable connection to the communication network (e.g., macro and/or small cell communication network), and/or no or inadequate advance capabilities (e.g., network slicing). The slice component can be associated with a vehicle or movable device (e.g., motorized device that can move to a desired location), and the slice component can comprise or be associated with a mobile (e.g., local, internal) communication network comprising mobile network devices, wherein the slice component and the mobile communication network can move with the vehicle or movable device. The vehicle or movable device can move to be located in proximity to (e.g., within a defined distance of) the communication device to enable the wireless communication connection to be established between the communication device and a network device of the communication network via the mobile network device and a network node device (e.g., base station, eNode, eNodeB, or gNB) of or associated with the communication network. For instance, the slice component can initiate, establish, or facilitate establishing the wireless communication connection between the communication device and the communication network via the mobile network device of the mobile communication network when the vehicle or movable (e.g., motorized) device, and the associated slice component and mobile communication network, are located (e.g., travel to be located) in proximity to the communication device.

At 404, a slice of a service network can be generated (e.g., created) for a communication device to facilitate secure communication of information between the service network and the communication device using the slice (and associated wireless communication connection). The slice component can generate or facilitate generating the slice (e.g., service slice) of the service network, and a corresponding slice (e.g., core slice) of the core network of the communication network, for use by the communication device. The slice of the service network, in conjunction with the corresponding slice of the core network, can enable providing a secure communication channel between the service network and the communication device, providing applications and functions (e.g., VNFs) to the communication device, and secure communication of information between the service network (of or associated with the communication network) and the communication device using the slice of the service network (and associated wireless communication connection provided via the mobile network device).

FIG. 5 depicts a flow diagram of another example, non-limiting method 500 that can generate and manage a slice of a service network for a communication device, in accordance with various aspects and embodiments of the disclosed subject matter. The method 500 can be implemented by a slice component that can comprise or be associated with a processor a memory. Alternatively, or additionally, a machine-readable storage medium can comprise executable instructions that, when executed by a processor, facilitate performance of operations for the method 500.

At 502, to facilitate establishing a communication session, a communication connection (e.g., wireless communication connection) can be established between a communication device, for example, located in an underserved/unserved area, and a network device of a communication network via a mobile network device located in proximity to the communication device. The communication device can be located, for example, in an underserved/unserved area (e.g., rural or pastoral area) where often there can be limited or no wireless communication coverage available to provide wireless communication services to communication devices, such as the communication device, to enable connection to a network device (e.g., macro or small cell communication network device) of the communication network (e.g., macro or small cell communication network), and/or no or inadequate advance capabilities (e.g., network slicing). The slice component can be associated with a movable component (e.g., a vehicle (e.g., a motorized, or unmotorized or manually operated vehicle), or a motorized device), and the slice component can be or can comprise the mobile network device. The slice component can initiate, establish, or facilitate establishing (e.g., generating) the communication connection between the communication device and the network device of the communication network via the mobile network device, for example, when the vehicle and associated slice component are located (e.g., travel to be located) in proximity to the communication device.

At 504, a slice of the service network can be generated for the communication device. The slice component can generate or facilitate generating the slice (e.g., service slice) of the service network, wherein the slice can be part of the service network associated with the communication network, and wherein the slice can relate to a service provided by the service network. The slice component can comprise, be associated with, and/or manage a mobile (e.g., local, internal) service network, wherein the mobile service network can comprise all or a desired portion of the applications and functionality (e.g., VNFs), scripts (e.g., code and other data for applications), data (e.g., data stored in the database component), etc., of the service network associated with the communication network. The slice component can coordinate with the network slice component of the communication network to facilitate generating the slice of the service network. The slice component also can coordinate with the network slice component to facilitate generating a core slice of the core network of the communication network. The slice component, employing the mobile network device, also can coordinate with the communication network to facilitate generating the core slice of the core network of the communication network.

As part of generating the slice and establishing the communication connection, the slice component can create a secure communication channel between the communication device and the service network (e.g., a service network device of the service network) via the mobile network device, wherein the secure communication channel can be used to securely communicate information between the communication device and the service network via the mobile network device. The secure communication channel can enable secure communication of information between the communication device and the service network via the mobile network device, in accordance with defined security criteria (e.g., as applicable, security criteria relating to HIPAA compliance, security criteria relating to military communications, security criteria relating to law enforcement communications, . . . ).

At 506, all or a desired portion of applications, functionality, and/or information associated with the service network can be provided or communicated to the communication device by the service network (or mobile service network) via the mobile network device. The slice component, employing the service slice (and corresponding core slice), the mobile service network, and the secure communication channel, can provide (e.g., make available), facilitate providing, communicate, or facilitate communicating, all or a desired portion of the applications, functionality, and/or information (e.g., service-related data, software or firmware updates, . . . ) associated with the service network (e.g., for the desired service of the service network) to the communication device, via the secure communication channel, to facilitate enabling the communication device to utilize the desired service associated with the slice in a secure environment. For instance, the slice component can provide, or facilitate providing, desired VNFs and/or information from the service network (or mobile service network) to the communication device, via the secure communication channel.

At 508, other information (e.g., data obtained by the communication device or associated sensors or other components, and/or other data obtained by the communication device from another communication device(s) associated therewith) can be communicated from the communication device to the service network (e.g., a service network device of the service network) using the slice of the service network (and corresponding core slice). The slice component, by providing and managing the service slice (and corresponding core slice), can facilitate enabling such other information to be communicated from the communication device to the service network using the service slice of the service network (and the corresponding core slice). For example, using the service slice, the service network can receive and collect information from the communication device, wherein such information can be stored in the database component of the service network. In some embodiments, such other information can comprise information obtained from one or more other communication devices by the communication device, in addition to information that the communication device collected itself (e.g., with respect to the entity with which it is associated, and/or conditions or characteristics associated with the entity and/or communication device, . . . ).

For example, the respective communication devices can comprise or be associated with respective sensors or other components that can sense or identify respective conditions, characteristics, measurements, etc., associated with the respective communication devices and/or respectively associated entities. The communication device can receive the respective information (e.g., information obtained by the respective sensors or other components) from the other communication devices. The communication device can communicate the information it obtained from its sensors or other components, and the other information it received from the other communication devices, to the service network, via a secure communication channel, using the slice of the service network (and corresponding core slice).

FIG. 6 illustrates a flow diagram of an example, non-limiting method 600 that, for a communication device, can generate and manage an internal slice of a local service network associated with a local (e.g., mobile) communication network associated with a vehicle or movable device, and synchronize information between the local service network and a service network of a communication network, in accordance with various aspects and embodiments of the disclosed subject matter. The method 600 can be implemented by a slice component that can comprise or be associated with a processor a memory. Alternatively, or additionally, a machine-readable storage medium can comprise executable instructions that, when executed by a processor, facilitate performance of operations for the method 600.

At 602, a determination can be made that a mobile network device associated with a movable component (e.g., vehicle or motorized device) is unable to establish or maintain a communication connection with a communication network and associated service network. The slice component of or associated with the movable component can be, can comprise, or be associated with the mobile network device, which can be used to establish a communication connection (e.g., wireless communication connection) between the communication network (e.g., macro or small cell communication network) (and associated service network) and a communication device located in an area where the movable component is located. The area can be an underserved or unserved area where wireless communication coverage of the communication network typically can be limited or non-existent.

In some instances (e.g., due to interference between mobile network device and the communication network), it may not be possible to establish a communication connection, or to maintain a communication connection, between the mobile network device and the communication network. In such instances, the slice component can determine that the mobile network device associated with the movable component is unable to establish or maintain a communication connection with the communication network and associated service network.

At 604, to facilitate establishing a communication session, a communication connection (e.g., wireless communication connection) can be established between the communication device in the underserved/unserved area and the mobile network device located in proximity to the communication device. The slice component, employing the mobile network device of the mobile (e.g., local, internal) core network of, associated with, and/or managed by the slice component, can establish the communication connection, including a secure communication channel (e.g., as part of generating an internal slice, as described with regard to reference numeral 606), between the communication device and the mobile network device. The secure communication channel can enable secure communication of information between the communication device and the mobile network device, in accordance with defined security criteria (e.g., security criteria, as applicable, relating to HIPAA compliance, security criteria relating to military communications, security criteria relating to law enforcement communications, . . . ).

At 606, an internal slice of the service network can be generated for the communication device. The slice component can generate an internal slice (e.g. internal service slice) associated with the service network, wherein the internal slice can be part of the mobile (e.g., local, internal, portable) service network associated with the mobile network device. The slice component also can generate or facilitate generating a corresponding internal core slice of a mobile core network associated with the mobile network device.

The slice component also can comprise, be associated with, and/or manage the mobile service network, wherein the mobile service network can comprise all or a desired portion of the applications and functionality (e.g., VNFs), scripts (e.g., code and other data for applications), data (e.g., service-related data stored in the database component), etc., of the service network associated with the communication network. As part of generating the internal slice (and corresponding internal core slice) and establishing the communication connection, the slice component can create a secure communication channel that can be used to securely communicate information between the communication device and the mobile service network via the mobile network device associated with the mobile core network.

At 608, employing the internal slice, all or a portion of applications, functionality, and data associated with the service network can be provided to the communication device via the mobile (e.g., internal, local, portable) service network associated with the mobile network device. The slice component, employing the internal slice (and internal core slice) and the mobile service network, can provide all or a portion of the applications, functionality, and data associated with the service network to the communication device to facilitate enabling the communication device to utilize the desired service associated with the internal slice in a secure environment.

At 610, information can be communicated from the communication device to the mobile service network using the internal slice. At 612, such information can be stored in a mobile database component of the mobile service network associated with the internal slice. During the communication session, information can be received, via the secure communication channel, from the communication device by the mobile service network and stored in the mobile database component of the mobile service network associated with the slice component and mobile network device. Additionally or alternatively, other information stored in the mobile database component (e.g., information relating to the service and/or the user, entity, or equipment, etc., associated with the communication device) can be communicated, via the secure communication channel, from the mobile service network to the communication device (e.g., as indicated at reference numeral 608).

At 614, a communication connection (e.g., a wireless communication connection) can be established between the mobile network device and the communication network and associated service network (and/or accordingly, via the mobile network device, between the communication device and the communication network and associated service network). The slice component, employing the mobile network device, can determine that a communication connection can be established between the mobile network device and the communication network and associated service network. For example, a movable component (e.g., a vehicle, or motorized or movable device) associated with the slice component can move to a location where the mobile network device is able to connect to the communication network (e.g., macro or small cell communication network) and/or interference that was inhibiting connection between the mobile network device and the communication network can be mitigated or removed (e.g., whether or not the vehicle moves to a different location). In response to determining that a communication connection can be established between the mobile network device and the communication network, the slice component can establish the communication connection (e.g., wireless communication connection), including a secure communication channel, between the mobile network device and the communication network and associated service network (and/or between the communication device and the communication network and associated service network (e.g., if the communication session of the communication device is still in progress)).

At 616, a slice of the service network can be generated with respect to the communication device. The slice component can generate the slice (e.g., service slice) of the service network associated with the communication network and/or a corresponding slice (e.g., core slice) of the core network of the communication network. As part of generating the slice (and/or the corresponding slice of the core network) and establishing the communication connection with the communication network, the slice component can create a secure communication channel that can be used to securely communicate information between the mobile network device and the service network (and/or between the communication device and the service network via the mobile network device (e.g., if the communication session with the communication device is still in progress)).

The network slice component of the communication network can coordinate with the slice component associated with the movable component to facilitate generation of the slice of the service network (and/or corresponding slice of the core network). The network slice component can comprise, be associated with, and/or manage the service network, wherein the service network can comprise the applications and functionality (e.g., VNFs), scripts (e.g., code and other data for applications), information (e.g., information stored in the database component), etc., of the service network.

At 618, in response to establishing the communication connection and the slice between the mobile network device and the communication network (and associated service network), information relating to the communication session can be synchronized between the service network and the mobile service network. The slice component, employing the mobile network device and the secure communication channel, can facilitate communicating information relating to the communication session associated with the communication device to the service network, and/or receiving other information from the service network for communication to the communication device, to synchronize information between the service network (e.g., the database component of the service network) and the mobile service network (e.g., the mobile database component of the mobile service network) and/or to provide the other information, or a portion thereof, to the communication device in connection with the communication session. For instance, the other information can be determined (e.g., by the network slice component) based at least in part on (e.g., in response to) the information relating to the communication session communicated to the service network. If the communication session, which had been using the internal slice, is still in progress, the communication session can continue using the slice (e.g., service slice) and corresponding slice (e.g., core slice).

Described herein are systems, methods, articles of manufacture, and other embodiments or implementations that can facilitate generating (e.g., creating) slices of a service network (e.g., in underserved/unserved geographical areas, such as rural areas, using a mobile (e.g., movable) network device), generating slices of a core network, securely communicating information via a secure communication channel using the slices, providing applications and functions associated with services, securely performing software and firmware updates using the secure slices, and performing other functions and operations, as more fully described herein. Facilitating generating slices of a service network, generating slices of a core network, securely communicating information via a secure communication channel using the slices, providing applications and functions associated with services, securely performing software and firmware updates using the secure slices, and performing other functions and operations can be implemented in connection with any type of device with a connection to the communications network (e.g., a mobile device, a computer, a handheld device, a wearable device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 7:
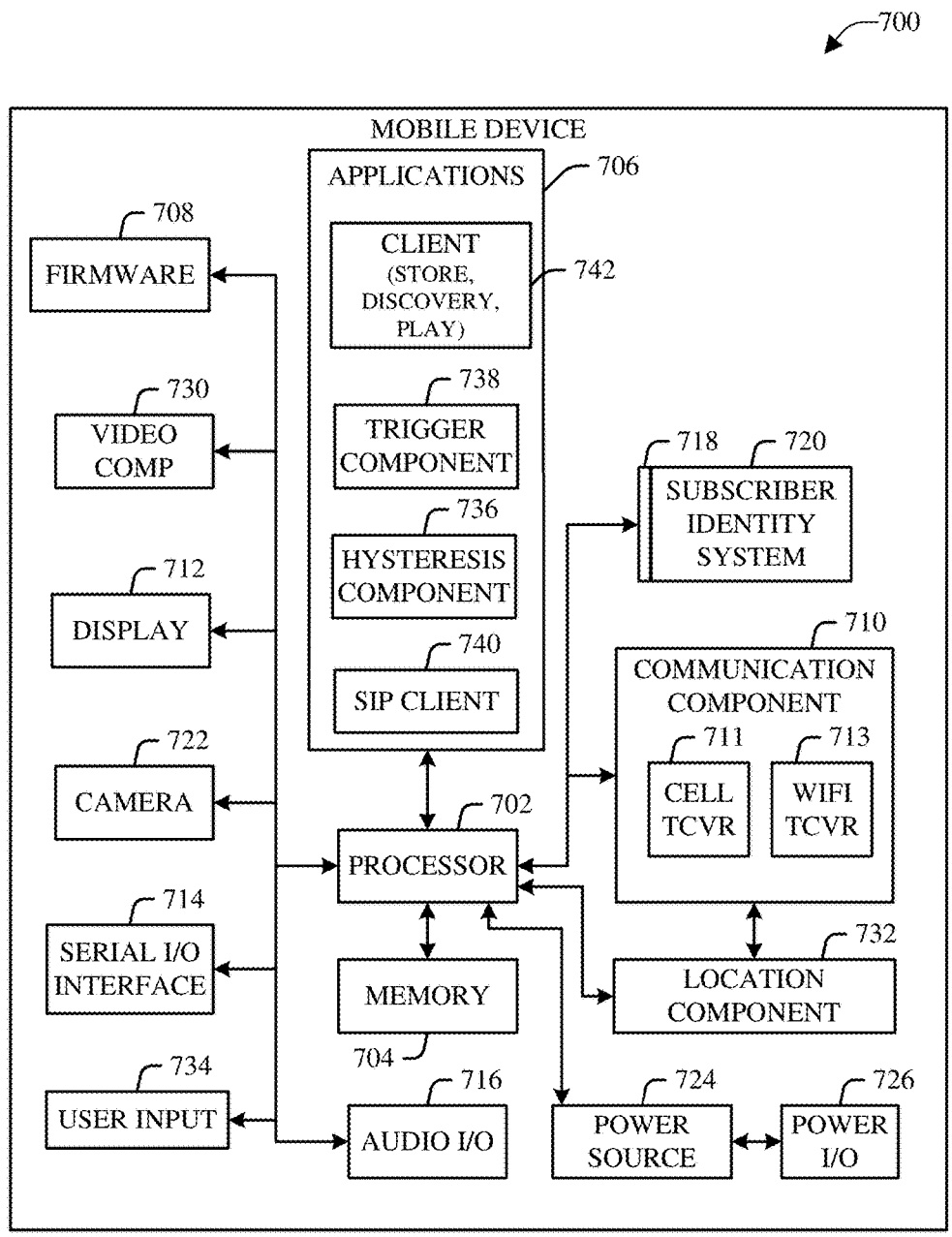
FIG. 7 depicts an example block diagram of an example mobile device operable to engage in a system architecture that facilitates wireless communications according to one or more embodiments described herein.

Referring now to FIG. 7, depicted is an example block diagram of an example mobile device 700 (e.g., mobile communication device, mobile handset) operable to engage in a system architecture that facilitates wireless communications according to one or more embodiments described herein. Although a mobile device is illustrated herein, it will be understood that other devices can be a mobile device, and that the mobile device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The device 700 can include a processor 702 for controlling and processing all onboard operations and functions. A memory 704 interfaces to the processor 702 for storage of data and one or more applications 706 (e.g., a video player software, user feedback component software, etc.). Other applications can include voice recognition of predetermined voice commands that facilitate initiation of the user feedback signals. The applications 706 can be stored in the memory 704 and/or in a firmware 708, and executed by the processor 702 from either or both the memory 704 or/and the firmware 708. The firmware 708 can also store startup code for execution in initializing the device 700. A communication component 710 can interface to the processor 702 to facilitate wired/wireless communication with external systems, e.g., cellular networks, VOID networks, and so on. Here, the communication component 710 also can include a suitable cellular transceiver 711 (e.g., a GSM transceiver) and/or an unlicensed transceiver 713 (e.g., Wi-Fi, WiMax) for corresponding signal communications. The device 700 can be a device such as a cellular telephone, a PDA with mobile communications capabilities, and messaging-centric devices. The communication component 710 also facilitates communications reception from terrestrial radio networks (e.g., broadcast), digital satellite radio networks, and Internet-based radio services networks.

The device 700 includes a display 712 for displaying text, images, video, telephony functions (e.g., a Caller ID function), setup functions, and for user input. For example, the display 712 can also be referred to as a "screen" that can accommodate the presentation of multimedia content (e.g., music metadata, messages, wallpaper, graphics, etc.). The display 712 can also display videos and can facilitate the generation, editing and sharing of video quotes. A serial I/O interface 714 is provided in communication with the processor 702 to facilitate wired and/or wireless serial communications (e.g., USB, and/or IEEE 1394) through a hardwire connection, and other serial input devices (e.g., a keyboard, keypad, and mouse). This supports updating and troubleshooting the device 700, for example. Audio capabilities are provided with an audio I/O component 716, which can include a speaker for the output of audio signals related to, for example, indication that the user pressed the proper key or key combination to initiate the user feedback signal. The audio I/O component 716 also facilitates the input of audio signals through a microphone to record data and/or telephony voice data, and for inputting voice signals for telephone conversations.

The device 700 can include a slot interface 718 for accommodating a SIC (Subscriber Identity Component) in the form factor of a card Subscriber Identity Module (SIM) or universal SIM 720, and interfacing the SIM card 720 with the processor 702. However, it is to be appreciated that the SIM card 720 can be manufactured into the device 700, and updated by downloading data and software.

The device 700 can process IP data traffic through the communication component 710 to accommodate IP traffic from an IP network such as, for example, the Internet, a corporate intranet, a home network, a person area network, etc., through an ISP or broadband cable provider. Thus, VoIP traffic can be utilized by the device 700 and IP-based multimedia content can be received in either an encoded or a decoded format.

A video processing component 722 (e.g., a camera) can be provided for decoding encoded multimedia content. The video processing component 722 can aid in facilitating the generation, editing, and sharing of video quotes. The device 700 also includes a power source 724 in the form of batteries and/or an AC power subsystem, which power source 724 can interface to an external power system or charging equipment (not shown) by a power 110 component 726.

The device 700 can also include a video component 730 for processing video content received and, for recording and transmitting video content. For example, the video component 730 can facilitate the generation, editing and sharing of video quotes. A location tracking component 732 facilitates geographically locating the device 700. As described hereinabove, this can occur when the user initiates the feedback signal automatically or manually. A user input component 734 facilitates the user initiating the quality feedback signal. The user input component 734 can also facilitate the generation, editing and sharing of video quotes. The user input component 734 can include such conventional input device technologies such as a keypad, keyboard, mouse, stylus pen, and/or touch screen, for example.

Referring again to the applications 706, a hysteresis component 736 can facilitate the analysis and processing of hysteresis data, which can be utilized to determine when to associate with the access point. A software trigger component 738 can be provided that facilitates triggering of the hysteresis component 736 when the Wi-Fi transceiver 713 detects the beacon of the access point. A SIP client 740 enables the device 700 to support SIP protocols and register the subscriber with the SIP registrar server. The applications 706 can also include a client 742 that provides at least the capability of discovery, play and store of multimedia content, for example, music.

The device 700, as indicated above related to the communication component 710, includes an indoor network radio transceiver 713 (e.g., Wi-Fi transceiver). This function supports the indoor radio link, such as IEEE 802.11, for the dual-mode GSM device (e.g., device 700). The device 700 can accommodate at least satellite radio services through a device that can combine wireless voice and digital radio chipsets into a single handheld device.

Figure 8:
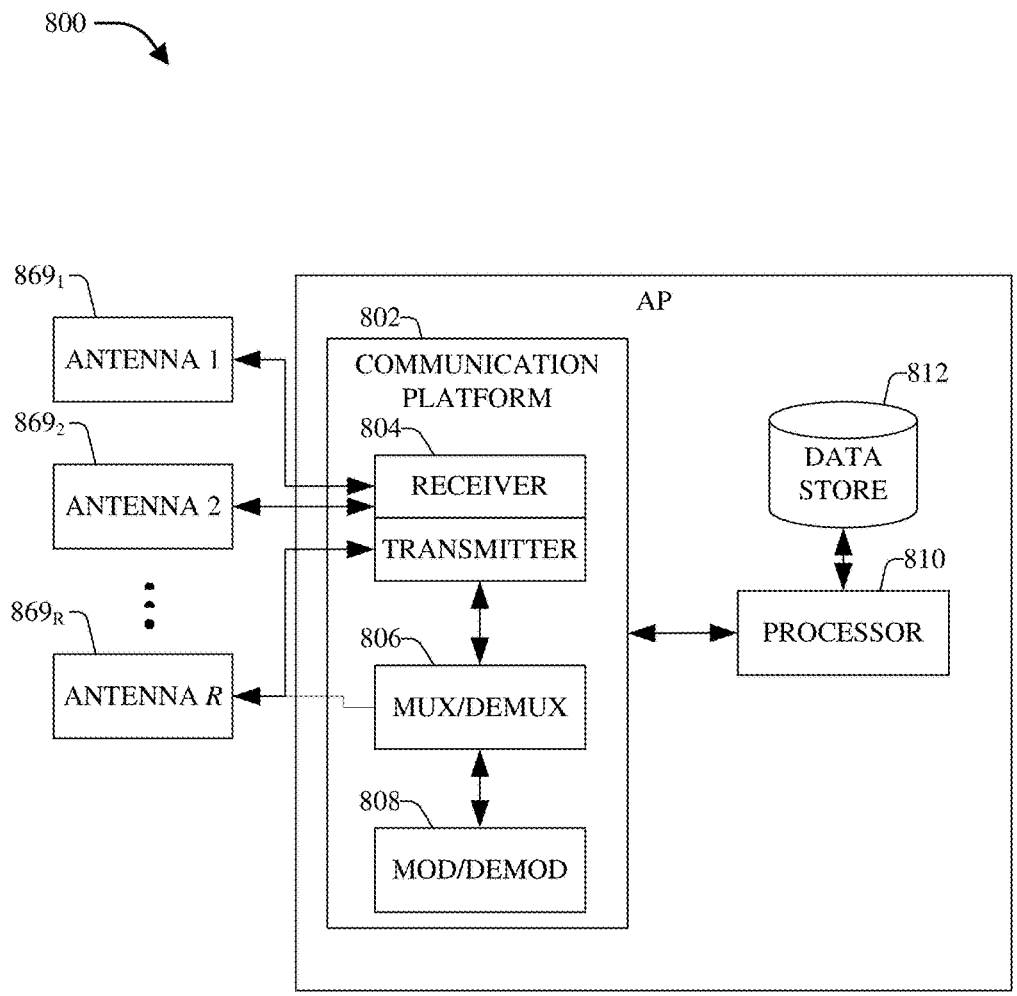
FIG. 8 illustrates a block diagram of an example access point, in accordance with various aspects and embodiments of the disclosed subject matter.

FIG. 8 illustrates a block diagram of an example AP 800 (e.g., a mobile network device or mobile AP, macro base station, eNode, eNodeB, gNB, femto AP, pico AP, Wi-Fi AP, Wi-Fi-direct AP, . . . ), in accordance with various aspects and embodiments of the disclosed subject matter. For example, the AP 800 can be, or can be associated with, a mobile network device that can be associated with a mobile communication network and associated mobile service network (associated with a service network that can be associated with the communication network), wherein the AP 800 can be associated with (e.g., part of, attached to, or integrated with a movable component, such as a vehicle or movable device). The AP 800 can receive and transmit signal(s) from and to wireless devices like access points (e.g., base stations, femtocells, picocells), access terminals (e.g., UEs), wireless ports and routers, and the like, through a set of antennas $869_1$-$869_R$. In an aspect, the antennas $869_1$-$869_R$ are a part of a communication platform 802, which comprises electronic components and associated circuitry that can provide for processing and manipulation of received signal(s) and signal(s) to be transmitted. In an aspect, the communication platform 802 can include a receiver/transmitter 804 that can convert signal from analog to digital upon reception, and from digital to analog upon transmission. In addition, receiver/transmitter 804 can divide a single data stream into multiple, parallel data streams, or perform the reciprocal operation.

In an aspect, coupled to receiver/transmitter 804 can be a multiplexer/demultiplexer (mux/demux) 806 that can facilitate manipulation of signal in time and frequency space. The mux/demux 806 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 806 can scramble and spread information (e.g., codes) according to substantially any code known in the art, e.g., Hadamard-Walsh codes, Baker codes, Kasami codes, polyphase codes, and so on. A modulator/demodulator (mod/demod) 808 also can be part of the communication platform 802, and can modulate information according to multiple modulation techniques, such as frequency modulation, amplitude modulation (e.g., M-ary quadrature amplitude modulation (QAM), with M a positive integer), phase-shift keying (PSK), and the like.

The AP 800 also can comprise a processor(s) 810 that can be configured to confer and/or facilitate providing functionality, at least partially, to substantially any electronic component in or associated with the AP 800. For instance, the processor(s) 810 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc.

In another aspect, the AP 800 can include a data store 812 that can store data structures; code instructions; rate coding information; information relating to measurement of radio link quality or reception of information related thereto; information relating to communication devices (e.g., UEs), control channels, control channel formats, control channel information, CSI, parameters relating to data communications, reference signals, signaling, reference signal management criteria, traffic flows, policies, algorithms (e.g., algorithms relating to multiplexing/demultiplexing or modulation/demodulation); white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 810 can be coupled to the data store 812 in order to store and retrieve information (e.g., information, such as algorithms relating to multiplexing/demultiplexing or modulation/demodulation; information relating to radio link levels; information relating to establishing communication connections associated with a communication device(s) served by the AP 800; . . . ) desired to operate and/or confer functionality to the communication platform 802 and/or other operational components of AP 800.

Figure 9:
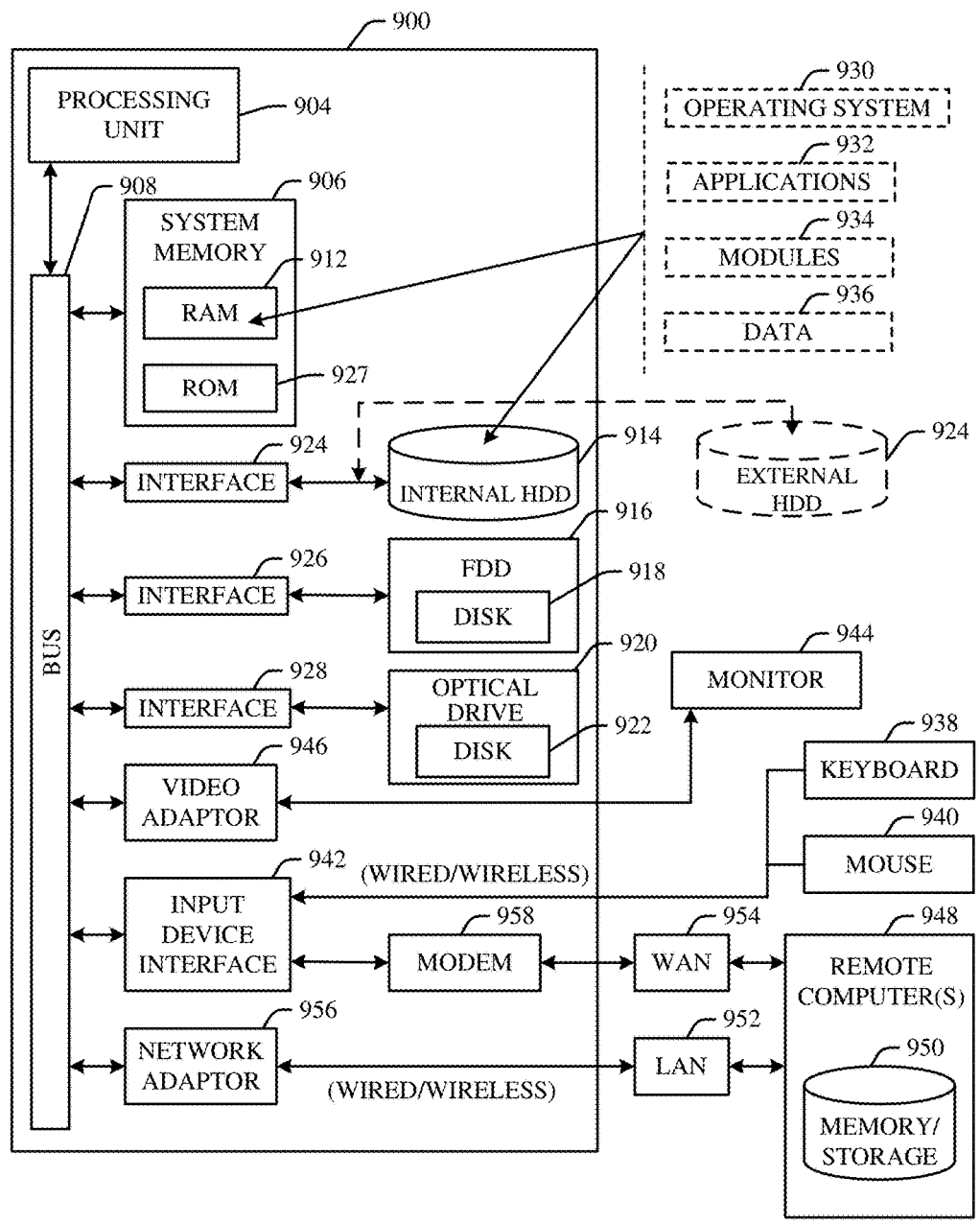
FIG. 9 illustrates an example block diagram of an example computer operable to engage in a system architecture that facilitates wireless communications according to one or more embodiments described herein.

Referring now to FIG. 9, illustrated is an example block diagram of an example computer 900 operable to engage in a system architecture that facilitates wireless communications according to one or more embodiments described herein. The computer 900 can provide networking and communication capabilities between a wired or wireless communication network and a server (e.g., Microsoft server) and/or communication device. In order to provide additional context for various aspects thereof, FIG. 9 and the following discussion are intended to provide a brief, general description of a suitable computing environment in which the various aspects of the disclosed subject matter can be implemented to facilitate generating and managing slices (e.g., service slices, internal service slices, core slices, internal core slices) associated with services, providing and managing services and service-related functions and applications, communicating (e.g., securely communicating) information associated with services, in or associated with a communication network and/or a mobile network (e.g., mobile service network, mobile core network) in underserved or unserved areas, as more fully described herein. While the description above is in the general context of computer-executable instructions that can run on one or more computers, those skilled in the art will recognize that the disclosed subject also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter can also be practiced in distributed computing environments where certain tasks are performed by remote processing devices that can be linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 9, implementing various aspects described herein with regards to the end-user device can include a computer 900, the computer 900 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes read-only memory (ROM) 927 and random access memory (RAM) 912. A basic input/output system (BIOS) is stored in a non-volatile memory 927 such as ROM, EPROM, EEPROM, which BIOS contains the basic routines that help to transfer information between elements within the computer 900, such as during start-up. The RAM 912 can also include a high-speed RAM such as static RAM for caching data.

The computer 900 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the disclosed subject matter.

The drives and their associated computer-readable media provide nonvolatile storage of data, data structures, computer-executable instructions, and so forth. For the computer 900 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 900, such as zip drives, magnetic cassettes, flash memory cards, cartridges, and the like, can also be used in the exemplary operating environment, and further, that any such media can contain computer-executable instructions for performing the methods of the disclosed subject matter.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the disclosed subject matter can be implemented with various commercially available operating systems or combinations of operating systems.

A user can enter commands and information into the computer 900 through one or more wired/wireless input devices, e.g., a keyboard 938 and a pointing device, such as a mouse 940. Other input devices (not shown) can include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer 900 typically includes other peripheral output devices (not shown), such as speakers, printers, etc.

The computer 900 can operate in a networked environment using logical connections by wired and/or wireless communications to one or more remote computers, such as a remote computer(s) 948. The remote computer(s) 948 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 900 is connected to the local network 952 through a wired and/or wireless communication network interface or adapter 956. The adapter 956 can facilitate wired or wireless communication to the LAN 952, which can also include a wireless access point disposed thereon for communicating with the wireless adapter 956.

When used in a WAN networking environment, the computer 900 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the input device interface 942. In a networked environment, program modules depicted relative to the computer, or portions thereof, can be stored in the remote memory/storage device 950. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi, Bluetooth™, and near field communication (NFC) wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like can refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

It is to be appreciated and understood that components (e.g., communication device, slice component, service network, core network, mobile service network, mobile core network, mobile network device, movable component, base station, cell, communication network, processor component, data store, . . . ), as described with regard to a particular system or method, can include the same or similar functionality as respective components (e.g., respectively named components or similarly named components) as described with regard to other systems or methods disclosed herein.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
initiating, via a mobile network device, a wireless communication connection between a communication device and a communication network device of a communication network, wherein the mobile network device is located in proximity to the communication device; and
generating a service slice of a service network that is associated with the communication network, wherein the service slice and the wireless communication connection are utilized to facilitate secure communication of information between the communication device and a service network device of the service network, in accordance with a defined security criterion relating to a service that is provided by the service network.

2. The system of claim 1, wherein the operations further comprise:
generating a core slice of a core network of the communication network, wherein the core slice is associated with the service slice, wherein the service slice and the core slice facilitate generation of a secure communication channel between the communication device and the service network device to facilitate the secure communication of the information between the communication device and the service network device, in accordance with the defined security criterion.

3. The system of claim 1, wherein the information comprises a first portion of the information associated with the communication device, and wherein the operations further comprise:

facilitating communication, via the service slice and the mobile network device, of the first portion of the information from the communication device to the service network device for storage in a database component of the service network.

4. The system of claim 1, wherein the operations further comprise:
facilitating, using the service slice, providing a virtual network function associated with the service to the communication device.

5. The system of claim 1, wherein a portion of the information communicated between the service network device and the communication device comprises update information associated with the service, wherein the operations further comprise:
facilitating, using the service slice, communication of the update information from the service network device to the communication device, and wherein the update information is related to an update of a group of updates comprising a software update relating to the service and a firmware update relating to the service.

6. The system of claim 1, wherein the operations further comprise:
in response to determining that, during a first time period, a communication connection between the communication device and the communication network device is not able to be established:
establishing a connection portion of the wireless communication connection between the communication device and the mobile network device; and
generating an internal service slice of a mobile service network to be used by the communication device, wherein the internal service slice and connection portion of the wireless communication connection are utilized to facilitate the secure communication of at least a portion of the information between a mobile service network device of the mobile service network and the communication device, in accordance with the defined security criterion.

7. The system of claim 6, wherein the operations further comprise:
utilizing the internal service slice to facilitate providing a virtual network function associated with the service to the communication device.

8. The system of claim 6, wherein the operations further comprise:
via the internal service slice, receiving a portion of the information from the communication device; and
storing the portion of the information in a mobile database component associated with the internal service slice and the mobile network device.

9. The system of claim 6, wherein the operations further comprise:
during a second time period, in response to determining that, the wireless communication connection between the communication device and the communication network device is able to be established, establishing, via the mobile network device, the wireless communication connection between the communication device and the communication network device, wherein the service slice of the service network is generated in connection with the establishing of the wireless communication connection; and
communicating at least a portion of the information between the mobile network device and the service network device to facilitate synchronizing at least the portion of the information between the communication device, the mobile network device, and the service network device in connection with the service.

10. The system of claim 1, wherein the mobile network device and a slice component, comprising a mobile database component, are associated with a movable component of a group of movable components comprising a vehicle and a motorized device, wherein the movable component is operable to move between locations, comprising moving from a first location to a second location, to facilitate moving the mobile network device and the slice component from the first location to the second location to place the mobile network device and the slice component in proximity to the communication device, wherein the slice component initiates the wireless communication connection and generates the service slice, and wherein the mobile database component stores data of the service network, including the service.

11. The system of claim 10, wherein the communication device and the mobile network device are located in an area, and wherein, while the communication is located in the area, the communication network device of the communication network is not able to provide wireless communication service, comprising the wireless communication connection, to the communication device without utilizing the mobile network device to facilitate providing the wireless communication service to the communication device.

12. A method, comprising:
facilitating, by a system comprising a processor, establishing a wireless connection between a device and a network device via a mobile network device, wherein the network device is part of a communication network, wherein the mobile network device is located within a defined distance of the device to enable the establishing of the wireless connection between the device and the network device via the mobile network device; and
generating, by the system, a service slice of a service network that is associated with the communication network, wherein the service slice and the wireless connection are utilized to facilitate securely communicating service-related data between the device and a service network device of the service network, in accordance with a defined security criterion relating to a service that is facilitated by the service network.

13. The method of claim 12, wherein the wireless connection is a first wireless connection, and wherein the method further comprises:
based on the mobile network device being within the defined distance of the device, establishing, by the system, a second wireless connection between the device and the mobile network device, and wherein the first wireless connection comprises the second wireless connection.

14. The method of claim 12, further comprising:
generating, by the system, a core slice of a core network of the communication network, wherein the core slice is associated with the service slice; and
based on the service slice and the core slice, generating, by the system, a secure communication channel between the device and the service network device to facilitate the securely communicating of the service-related data between the device and the service network device, in accordance with the defined security criterion.

15. The method of claim 12, wherein the service-related data comprises a first portion of the service-related data associated with the device, and wherein the method further comprises:

facilitating, by the system, communicating, via the service slice and the mobile network device, the first portion of the service-related data from the device to the service network device, and wherein the first portion of the service-related data is stored in a database component of the service network.

16. The method of claim 12, further comprising:
utilizing, by the system, the service slice to facilitate providing a virtual network function associated with the service to the device.

17. The method of claim 12, wherein a portion of the service-related data comprises update data associated with the service, and wherein the method further comprises:
facilitating, by the system, communicating, via the service slice and the mobile network device, the update data from the service network device to the device, and wherein the update data is related to an update of a group of updates comprising a software update relating to the service and a firmware update relating to the service.

18. The method of claim 12, wherein the mobile network device and a slice component, comprising a local database component, are associated with a movable device of a group of movable devices comprising a motor vehicle and a motorized device, wherein the movable device is operable to move to various geographical locations to facilitate moving the mobile network device and the slice component to place the mobile network device and the slice component within the defined distance of the device, wherein the slice component facilitates establishing the wireless connection and generating the service slice, wherein the local database component stores data associated with the service network, including the service, and wherein the data comprises a portion of the service-related data.

19. A non-transitory machine-readable medium, comprising executable instructions that, when executed by a processor, facilitate performance of operations, comprising:
initiating, via a movable network device, a wireless connection between a device and a network device of a communication network, wherein the movable network device is located in proximity to the device to enable the initiating of the wireless connection between the device and the network device via the movable network device; and
creating a first slice of a service network, wherein the first slice and the wireless connection are usable to facilitate secure communication of information between the device and a service network device of the service network, in accordance with a defined security criterion relating to a service that is provided by the service network.

20. The non-transitory machine-readable medium of claim 19, wherein the operations further comprise:
creating a second slice of a core network of the communication network, wherein the second slice is associated with the first slice; and
based on the first slice and the second slice, creating a secure communication channel between the device and the service network device to facilitate the secure communication of the information between the device and the service network device, in accordance with the defined security criterion.

* * * * *